(12) United States Patent
Hong et al.

(10) Patent No.: US 11,933,955 B2
(45) Date of Patent: Mar. 19, 2024

(54) METHOD FOR EVALUATING QUALITY OF GRAPHENE

(71) Applicants: SEOUL NATIONAL UNIVERSITY R&DB FOUNDATION, Seoul (KR); GRAPHENE SQUARE INC., Suwon-si (KR); Dankook University Cheonan Campus Industry Academic Cooperation Foundation, Cheonan-si (KR)

(72) Inventors: Byung Hee Hong, Suwon-si (KR); Dong Jin Kim, Suwon-si (KR); Yun Sung Woo, Yongin-si (KR)

(73) Assignees: SEOUL NATIONAL UNIVERSITY R&DB FOUNDATION, Seoul (KR); GRAPHENE SQUARE INC., Suwon-si (KR); Dankook University Cheonan Campus Industry Academic Cooperation Foundation, Cheonan-si (KR)

( * ) Notice: Subject to any disclaimer, the term of this patent is extended or adjusted under 35 U.S.C. 154(b) by 75 days.

(21) Appl. No.: 17/501,668

(22) Filed: Oct. 14, 2021

(65) Prior Publication Data

US 2022/0206276 A1    Jun. 30, 2022

(30) Foreign Application Priority Data

Dec. 29, 2020    (KR) ........................ 10-2020-0185690

(51) Int. Cl.
G02B 21/00    (2006.01)

(52) U.S. Cl.
CPC ....... *G02B 21/0028* (2013.01); *G02B 21/006* (2013.01); *G02B 21/008* (2013.01)

(58) Field of Classification Search
CPC .............. G02B 21/0028; G02B 21/006; G02B 21/008; G02B 21/00; G02B 21/0004;
(Continued)

(56) References Cited

U.S. PATENT DOCUMENTS

2015/0192520 A1*   7/2015   Kyle ................... G01N 21/6458
                                                          250/459.1
2015/0368109 A1    12/2015   Moon et al.
(Continued)

FOREIGN PATENT DOCUMENTS

JP        07003508 A       1/1995
JP        2015-528179 A    9/2015
(Continued)

OTHER PUBLICATIONS

Korean Office Action from related Korean Application No. 10-2020-0185690, dated Dec. 14, 2021, 6 pages.
(Continued)

*Primary Examiner* — Arnel C Lavarias
(74) *Attorney, Agent, or Firm* — DILWORTH IP, LLC

(57) ABSTRACT

A method of evaluating quality of graphene using a confocal laser scanning microscope, the method comprising steps of: irradiating with laser light a graphene layer formed on a catalyst layer; detecting a signal of light reflected from the graphene layer; forming a planar image of the graphene layer using the detected optical signal; and analyzing a contrast between graphene and the catalyst layer in the planar image, wherein the graphene layer is continuously formed on the catalyst layer by a roll-to-roll process.

10 Claims, 15 Drawing Sheets

(58) Field of Classification Search
CPC .............. G02B 21/002; G02B 21/0024; G02B 21/0032; G02B 21/0052; G02B 21/06; G02B 21/36; G02B 21/361; G02B 21/365; G01N 2223/40; G01N 2223/404; G01N 21/25; G01N 21/55; G01N 2021/557; G06T 5/00; G06T 5/40
USPC ............... 359/368, 362, 363, 369, 385, 388; 356/337, 338, 341, 402, 445, 448; 382/254, 274
See application file for complete search history.

(56) References Cited

U.S. PATENT DOCUMENTS

2018/0141008 A1    5/2018  Prince et al.
2019/0003956 A1*   1/2019  Campidelli ...... G01N 33/54373

FOREIGN PATENT DOCUMENTS

| KR | 10-1377166 B | 3/2014 |
|----|----|----|
| KR | 101751271 B | 6/2017 |
| KR | 1020190046534 A | 5/2019 |
| KR | 10-2170863 B | 10/2020 |
| WO | 2011-025045 A1 | 3/2011 |

OTHER PUBLICATIONS

Panchal, Vishal et al., Confocal laser scanning microscopy for rapid optical characterization of graphene, Communications Physics, DOI: 10.1038/s42005-018-0084-6, 2018, 7 pages.

Kim, Dong Jin et al., Confocal laser scanning microscopy as a real-time quality-assessment tool for industrial graphene synthesis, https://doi.org/10.1088/2053-1583/aba1d5, IPO Publishing, 2020, 2D Mater. 7 045014.

Kim, et al., Confocal laser scanning microscopy as a real-time quality-assessment tool for industrial graphene synthesis, Graphene & 2DM Industrial Forum, 1 page, May 27, 2020.

* cited by examiner (1)                      (2)

(1)          (2)          (3)

Example 9  Example 1

Example 4  Example 5  Comparative Example 4

Example 10

Example 11

(1)

(2)

(1)

(2)

METHOD FOR EVALUATING QUALITY OF GRAPHENE

BACKGROUND

1. Technical Field

The present disclosure relates to a method for evaluating the quality of graphene, and particularly, to a method capable of evaluating in real time the quality of graphene, which is being continuously formed, by using a confocal laser scanning microscope.

2. Background Art

Graphene has been used in various industrial fields, and techniques for synthesizing high-quality graphene over a large area by chemical vapor deposition (CVD) have been continuously developed. A method of synthesizing graphene by chemical vapor deposition generally includes growing graphene on the surface of a copper foil, heated to a high temperature, by supplying hydrogen and hydrocarbon gases onto the copper foil in a vacuum chamber. For quality control of graphene formed by chemical vapor deposition, the quality of graphene being synthesized is evaluated by screening.

In a conventional art, graphene is transferred onto a silicon oxide film having a certain thickness, and then the quality of the graphene is evaluated using an optical microscope or a Raman spectrum. In the method of evaluating the quality of graphene using an optical microscope, the image of graphene on a copper foil is directly analyzed. In particular, in this evaluation method, graphene grown on a copper foil may be analyzed using the optical microscope in dark field (DF) mode by Rayleigh light scattering, but this method has a limitation in that it may be applied only when graphene has grown on a copper foil having formed thereon portions which have significantly different heights. In addition, problems arise in that a lot of time is consumed to form a dark field (DF) image by weakly scattered light, and a sample including graphene formed on a copper foil should be exposed to light for a long time. Meanwhile, the method of evaluating the quality of graphene using a Raman spectrum is considerably time-consuming, and hence is not suitable as a method for evaluating large-area graphene.

Accordingly, there is a need for a technology capable of evaluating in real time the quality of graphene in a process of continuously synthesizing graphene over a large area, such as a roll-to-roll process.

SUMMARY

A technical problem to be achieved by the present disclosure is to provide a method capable of evaluating in real time the quality of graphene being continuously formed.

However, the technical problem to be achieved by the present disclosure is not limited to the above-mentioned problem, and other problems not mentioned herein will be clearly understood by those skilled in the art from the following description.

One embodiment of the present disclosure provides a method of evaluating the quality of graphene using a confocal laser scanning microscope, the method including steps of: irradiating with laser light a graphene layer formed on a catalyst layer; detecting a signal of light reflected from the graphene layer; forming a planar image of the graphene layer using the detected optical signal; and analyzing the contrast between graphene and the catalyst layer in the planar image.

DETAILED DESCRIPTION

Figure 1:
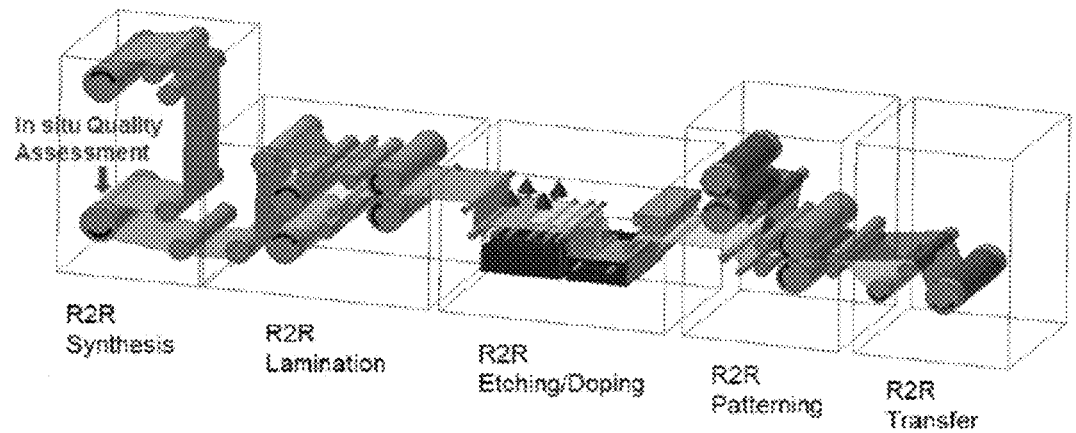
FIG. 1 is a conceptual view showing the sequential steps of a method of producing graphene using a roll-to-roll process.

Throughout the present specification, it is to be understood that when any part is referred to as "including" any component, it does not exclude other components, but may further include other components, unless otherwise specified.

Throughout the present specification, when any member is referred to as being "on" another member, it not only refers to a case where any member is in contact with another member, but also a case where a third member exists between the two members.

In the present specification, the term "step of . . . " does not mean a "step for . . . ."

In the present specification, the term "graphene layer" refers to a graphene layer or sheet in which a plurality of carbon atoms are covalently linked together to form a polycyclic aromatic molecule. The carbon atoms covalently linked together form a 6-membered ring as a basic repeating unit, but the graphene layer may also further include a 5-membered ring and/or a 7-membered ring. Accordingly, the "graphene layer" is viewed as a single layer of carbon atoms covalently bonded together (usually $sp^2$ bonds). The "graphene layer" may have various structures, and such structures may vary depending on the content of a 5-membered ring and/or 7-membered ring that may be contained in the graphene. The "graphene layer" may be composed of a single layer of graphene as described above, but a plurality of layers of graphene may be stacked together to a thickness of up to 100 nm.

Hereinafter, specific embodiments of the present disclosure will be described in detail with reference to the accompanying drawings.

One embodiment of the present disclosure provides a method of evaluating the quality of graphene using a confocal laser scanning microscope, the method including steps of: irradiating with laser light a graphene layer formed on a catalyst layer; detecting a signal of light reflected from the graphene layer; forming a planar image of the graphene layer using the detected optical signal; and analyzing the contrast between graphene and the catalyst layer in the planar image.

The method for evaluating the quality of graphene according to one embodiment of the present disclosure may evaluate in real time the quality of graphene being continuously formed. In addition, the method for evaluating the quality of graphene according to one embodiment of the present disclosure may quickly evaluate the quality of graphene formed in a large area.

According to one embodiment of the present disclosure, the method for evaluating the quality of graphene may evaluate the quality of graphene using a confocal microscope. Specifically, confocal laser scanning microscopy (CLSM) may be used. Compared to a conventional method of evaluating the quality of graphene using an optical microscope or a Raman spectrum, the method for evaluating the quality of graphene according to one embodiment of the present disclosure may quickly evaluate in real time the quality of graphene, which is being formed in a large area on a catalyst layer, by using confocal laser scanning microscopy.

FIG. 1 is a conceptual view showing the sequential steps of a method of producing graphene using a roll-to-roll process. Referring to FIG. 1, the method of producing graphene using a roll-to-roll process may include steps of: synthesizing a graphene layer on a catalyst layer; producing a laminate by laminating a flexible substrate on the graphene layer; transferring the graphene layer to the flexible substrate while etching the catalyst layer; patterning the graphene layer, transferred to the flexible substrate, in a predetermined pattern, and transferring the graphene layer to a substrate. As the method of producing graphene using the roll-to-roll process, the method described in Korean Patent No. 10-1300799 may be used. However, the method of producing graphene using the roll-to-roll process is not limited thereto, and graphene may be produced through the roll-to-roll process used in the art.

In this case, the method for evaluating the quality of graphene according to one embodiment of the present disclosure may be performed during the step of synthesizing the graphene layer on the catalyst layer.

According to one embodiment of the present disclosure, the graphene layer may be formed on the catalyst layer. Specifically, the graphene layer may be formed on the surface of the catalyst layer by synthesizing graphene on the surface of the catalyst layer using chemical vapor deposition. As the method of forming the graphene layer on the catalyst layer, a method for synthesizing graphene, which is used in the art, may be used without limitation. For example, graphene may be synthesized on the catalyst layer by supplying hydrogen gas and a carbon source onto the catalyst layer heated. The carbon source may include at least one of carbon monoxide, carbon dioxide, methane, ethane, ethylene, ethanol, acetylene, propane, butane, butadiene, pentane, pentene, cyclopentadiene, hexane, cyclohexane, benzene, and toluene, but the type of carbon source is not limited thereto.

According to one embodiment of the present disclosure, the catalyst layer may include at least one of Cu, Ni, Co, Fe, Pt, Au, Al, Cr, Mg, Mn, Mo, Rh, Si, Ta, Ti, W, U, V, Zr, Fe, brass, bronze, cupronickel, stainless steel, and Ge. The catalyst layer may be a metal catalyst layer for graphene synthesis, and an appropriate catalyst layer may be selected in consideration of graphene synthesis conditions.

According to one embodiment of the present disclosure, the catalyst layer may be provided as a thin film or a thick film. Specifically, the thickness of the catalyst layer may be 1 nm to 1,000 nm, 1 nm to 500 nm, or 1 nm to 300 nm. In addition, the thickness of the catalyst layer may be 1 μm to 1,000 μm, 1 μm to 500 μm, 1 μm to 100 μm, or 1 μm to 50 μm. In addition, the thickness of the catalyst layer may be 1 mm to 5 mm. However, the thickness of the catalyst layer is not limited thereto and may be determined in consideration of synthesis conditions of the graphene layer, the intended use of the graphene layer, and the like.

According to one embodiment of the present disclosure, the chemical vapor deposition may be performed at a temperature of 700° C. or higher. Specifically, the chemical vapor deposition may be performed at a temperature of 750° C. or higher, 800° C. or higher, 850° C. or higher, 900° C. or higher, or 1,000° C. or more. In addition, the chemical vapor deposition may be performed at a temperature of 2,000° C. or lower, 1,900° C. or lower, 1,800° C. or lower, 1,700° C. or lower, 1,600° C. or lower, or 1,500° C. or lower.

The temperature at which the chemical vapor deposition is performed may be determined according to the type of material forming the catalyst layer. Specifically, the chemical vapor deposition temperature may be determined in consideration of the melting point of the material forming the catalyst layer. For example, when the catalyst layer is formed of copper, the chemical vapor deposition may be performed at a temperature of 1,000° C. to 1,085° C. In addition, when the catalyst layer is formed of nickel, the chemical vapor deposition may be performed at a temperature of 750° C. to 850° C. In addition, when the catalyst layer is formed of palladium, the chemical vapor deposition may be performed at a temperature of 950° C. to 1,050° C.

When the temperature at which the chemical vapor deposition is performed is within the above-described range, the graphene layer may be stably formed on the catalyst layer, and the synthesized graphene may have excellent crystallinity. That is, as the temperature at which the chemical vapor deposition is performed is determined in consideration of the melting point of the material used to form the catalyst layer, it is possible to form the graphene layer stably on the catalyst layer and further enhance the crystallinity of the graphene synthesized.

In addition, the temperature at which the chemical vapor deposition (CVD) is performed may be determined through the method for evaluating the quality of graphene. For example, the graphene layer is formed on the catalyst layer at different temperatures at which CVD is performed, and the quality of graphene being synthesized at each temperature at which CVD is performed may be evaluated using the method for evaluating the quality of graphene. In addition, using the method for evaluating the quality of graphene, a suitable temperature at which CVD is performed may also be determined depending on conditions such as the type of catalyst layer, the thickness of the catalyst layer, the type of carbon source, the amount of carbon source supplied, and the synthesis time of graphene. Thereby, before the production of graphene, an appropriate temperature at which CVD is performed may be predetermined in consideration of conditions which are controlled in the graphene production process.

According to one embodiment of the present disclosure, graphene may be continuously formed on the catalyst layer by a roll-to-roll process. In order to form the graphene layer by the roll-to-roll process, the catalyst layer may be provided in the form of a roll. Specifically, the catalyst layer may be provided in the form of a metal foil having flexibility suitable for use in the roll-to-roll process. For example, the catalyst layer wound as a metal foil may be unwound, and the graphene layer may be formed on the unwound catalyst layer by chemical vapor deposition.

Figure 2:
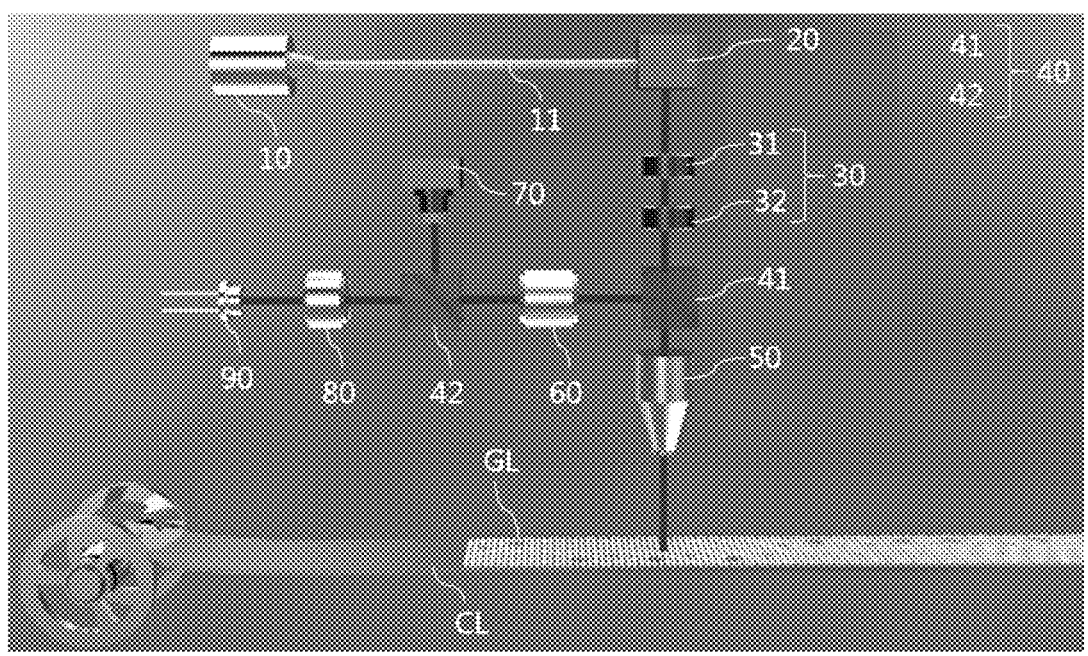
FIG. 2 is a view showing a method of evaluating the quality of graphene using a confocal laser scanning microscope according to one embodiment of the present disclosure.

FIG. 2 is a view showing a method of evaluating the quality of graphene using a confocal laser scanning microscope according to one embodiment of the present disclosure. Referring to FIG. 2, the confocal laser scanning microscope may include a light source 10, a beam scanner 20, a relay lens 30, a beam splitter 40, an objective lens 50, a tube lens 60, a camera 70, a collimator 80, and a photodetector 90. However, the components included in the confocal laser scanning microscope are not limited to those described above, and may additionally include components that are included in the confocal laser scanning microscope used in the art. For example, the confocal laser scanning microscope may further include a filter, a polarizing plate, and the like.

According to one embodiment of the present disclosure, a graphene layer GL formed on a catalyst layer CL may be irradiated with laser light. Referring to FIG. 2, the laser light emitted from the light source 10 included in the confocal laser scanning microscope may be reflected by the beam scanner 20, may pass through the relay lens 30, a first beam splitter 41 and the objective lens 50, and may be irradiated to the graphene layer GL.

According to one embodiment of the present disclosure, the light source 10 is a light source capable of emitting laser light, and a laser light source used in the art may be used without limitation. In this case, the light source 10 may control the wavelength of the emitted laser light. The light emitted from the light source 10 may be irradiated to the beam scanner 20 through an optical fiber 11.

According to one embodiment of the present disclosure, the laser light which is irradiated may have a wavelength of 400 nm to 550 nm. That is, the light source may emit laser light having a wavelength of 400 nm to 550 nm. Specifically, the wavelength of the laser light may be 400 nm to 545 nm, 400 nm to 520 nm, 400 nm to 500 nm, or 400 nm to 490 nm. When the wavelength value of the laser light is within the above range, the catalyst layer and the graphene may be clearly distinguished from each other in a planar image of the graphene layer as described later. Thereby, it is possible to effectively analyze the contrast between the graphene and the catalyst layer in the planar image.

According to one embodiment of the present disclosure, the beam scanner 20 may be configured to scan the surface positions of the graphene layer GL on the focal plane of the objective lens 50. The beam scanner 20 may include at least one of a resonant scanning mirror and a galvano mirror. Specifically, the beam scanner 20 may include a galvano mirror. The laser light emitted from the light source 10 may be irradiated to different positions on the surface of the graphene layer GL by the beam scanner 20. Specifically, the beam scanner 20 may scan the graphene layer GL in two dimensions by changing the position of the graphene layer GL which is irradiated with the laser light that passed through the objective lens 50.

In addition, the beam scanner 20 may further include a uniaxial scanner capable of axial scanning. As the beam scanner 20 further includes the uniaxial scanner, it may also scan the focus in three dimensions in the specimen space without moving the objective lens. In this case, the added uniaxial scanner may be implemented using electronic or mechanical focal modulation.

According to one embodiment of the present disclosure, the laser light reflected from the beam scanner 20 may be emitted to the relay lens 30. The relay lens 30 may include a first relay lens 31 and a second relay lens 32. The relay lens 30 may have a predetermined magnification, and the magnification of the relay lens 30 may be controlled by controlling the first and second relay lenses 31 and 32.

According to one embodiment of the present disclosure, the laser light that passed through the relay lens 30 may pass sequentially through the first beam splitter 41 and the objective lens 50, and may be irradiated to the graphene layer GL. Specifically, a target which is irradiated with the laser light may be the graphene layer GL formed by synthesizing graphene on a portion of the surface of the catalyst layer CL. The graphene layer GL may expose a portion of the catalyst layer CL without completely covering the surface of the catalyst layer CL. That is, the laser light may be irradiated to a composite including the catalyst layer CL and the graphene layer GL formed on a portion of the surface of the catalyst layer CL. Specific details thereon will be described later.

According to one embodiment of the present disclosure, the laser light (hereinafter referred to as reflected light) reflected from the graphene layer (e.g., the composite) may pass through the objective lens 50 and enter the first beam splitter 41 again. The reflected light that entered the first beam splitter 41 may be split into two or more lights, and one of these lights may enter the tube lens 60.

According to an exemplary embodiment of the present disclosure, the tube lens 60 may include a pinhole, and the pinhole corresponds to a component for forming a confocal image. The pinhole included in the tube lens 60 is adjustable between open and closed positions.

According to one embodiment of the present disclosure, the light that passed through the tube lens 60 may enter a second beam splitter 42 in which it may be split into two or more lights. Referring to FIG. 2, a portion of the light split in the second beam splitter 42 may enter the collimator 80, and the other portion may enter the camera 70. Here, the camera 70 may be a CCD camera. The collimator 80 may receive the light split in the second beam splitter 42 and convert the light into parallel light.

According to one embodiment of the present disclosure, a signal of the light reflected from the graphene layer GL may be detected. As described above, the light reflected from the graphene layer GL may pass through the objective lens 50, the first beam splitter 41, the tube lens 60, the second beam splitter 42 and the collimator 80 and enter the photodetector 90. The photodetector 90 may detect a signal of the reflected light. The photodetector 90 may include a photodiode, and may detect a signal from the incoming light using the photodiode. Specifically, the photodiode may detect the intensity of the incoming light and convert the intensity into a current. A photomultiplier tube may be used as the photodetector 90.

According to one embodiment of the present disclosure, a planar image of the graphene layer may be formed using the detected light signal. The planar image of the graphene layer may be a planar image of the surface of the graphene layer. Specifically, the planar image may include an image of a graphene layer portion formed on a portion of the surface of the catalyst layer, and an image of a catalyst layer portion exposed because the graphene has not been synthesized thereon.

According to one embodiment of the present disclosure, a planar image of the graphene layer may be formed by providing the detected optical signal to an image former provided in or outside the confocal laser scanning microscope. The type of image former is not particularly limited, and a system provided with software capable of forming an image using an electric current in the art may be used without limitation.

According to one embodiment of the present disclosure, the contrast between the graphene and the catalyst layer in the planar image may be analyzed. Through a simple method of analyzing the contrast between the graphene and the catalyst layer in the planar image, the quality of the graphene may be analyzed quickly and effectively.

According to one embodiment of the present disclosure, the step of analyzing the contrast may include analyzing the gray scale of a predetermined area of the planar image and calculating the contrast between the graphene and the catalyst layer in the area. Specifically, analysis of the gray scale may include obtaining and analyzing a grayscale histogram or a grayscale profile in the area. A predetermined area may be selected from the planar image, and a grayscale histogram or a grayscale profile may be obtained based on the gray scale of the catalyst layer and graphene in the selected predetermined area. By analyzing the grayscale histogram or grayscale profile obtained as described above, the contrast between graphene and the catalyst layer may be finally calculated.

According to one embodiment of the present disclosure, the grayscale profile may be obtained in the form of a grayscale line profile. When a grayscale histogram is used to analyze a small-sized area, it may be difficult to distinguish a graphene peak from a catalyst layer peak, because small peaks are formed in the grayscale histogram. In this case, the contrast between graphene and the catalyst layer in a small-sized area may be effectively analyzed using a grayscale profile instead of a grayscale histogram.

According to one embodiment of the present disclosure, the method for evaluating the quality of graphene may evaluate in real time the quality of graphene being continuously formed on the catalyst layer by a roll-to-roll process. Specifically, during the process of continuously forming graphene using the roll-to-roll process to which chemical vapor deposition is applied, the quality of graphene being synthesized may be evaluated in real time.

According to one embodiment of the present disclosure, the method for evaluating the quality of the graphene may be performed in real time during continuous formation of graphene. Specifically, the method for evaluating the quality of the graphene may be performed before the graphene layer is completely formed on the catalyst layer. That is, before graphene being synthesized covers the entire surface of the catalyst layer, the quality of the graphene may be evaluated by irradiating the graphene layer with laser light, as described above. When the graphene layer is formed on the entire surface of the catalyst layer, only the graphene layer appears in the planar image, and hence the contrast between the graphene and the catalyst layer cannot be analyzed.

According to one embodiment of the present disclosure, the graphene layer having a graphene coverage of 30% to 99% per unit area of the catalyst layer may be irradiated with laser light. Specifically, the coverage of the graphene layer which is irradiated with laser light may be 30% to 95%, 30% to 90%, 30% to 85%, 30% to 80%, 35% to 75%, 45% to 70%, 50% to 65%, 30% to 75%, or 70% to 99%.

The graphene coverage may be calculated by Equation 1 below.

Coverage (%)=total area of graphene layer in unit area of catalyst layer/unit area of catalyst layer    [Equation 1]

When a planar image of the graphene layer is obtained by irradiating with laser light the graphene layer having a graphene coverage satisfying the above-described range, the contrast between graphene and the catalyst layer in the planar image may be effectively analyzed.

In addition, according to one embodiment of the present disclosure, the graphene layer having a graphene coverage of 0.5% to 30% per unit area of the catalyst layer may be irradiated with laser light. When a planar image of the graphene layer is obtained by irradiating with laser light the graphene layer having a graphene coverage satisfying the above-described range, it is possible to effectively analyze the shape of a seed of the graphene layer in the planar image and/or the growth pattern of the graphene layer.

The unit area of the catalyst layer may be 10 $\mu m^2$ to 10,000 $\mu m^2$, but the unit area range of the catalyst layer for calculating the graphene layer coverage is not limited to the above-described range.

According to one embodiment of the present disclosure, the confocal laser scanning microscope may operate without a pinhole. As confirmed in the Examples to be described later, there was no difference between a planar image obtained by operation of the confocal laser scanning microscope including the pinhole and a planar image obtained by operation of the confocal laser scanning microscope including no pinhole. That is, in the method for evaluating the quality of graphene, a process of setting the pinhole to form a confocal image may be omitted. Thereby, it is possible to effectively reduce the execution time of the method for evaluating the quality of graphene and lower the execution difficulty thereof.

According to one embodiment of the present disclosure, in the method for evaluating the quality of graphene, the crystallinity of graphene being synthesized on the catalyst layer may be evaluated by analyzing the contrast between the graphene and the catalyst layer. The contrast between the graphene and the catalyst layer may be affected by defects in the graphene being synthesized, and as the crystallinity of the graphene being synthesized is better, the contrast may increase. In addition, as the crystallinity of the graphene being synthesized is better, the carrier mobility of the graphene may increase. That is, the quality of finally produced graphene may be predicted by analyzing the contrast between the graphene and the catalyst layer from the planar image of the graphene layer being synthesized on the catalyst layer.

According to one embodiment of the present disclosure, the method for evaluating the quality of graphene may further include a step of determining that the graphene layer has been formed on the catalyst layer, when the contrast between the graphene and the catalyst layer is 1.05 or more. Specifically, when the contrast between the graphene and the catalyst layer is 1.05 or more, it can be determined that graphene has been formed on the catalyst layer and the graphene layer has been produced.

Meanwhile, when the contrast between the graphene and the catalyst layer is 1.10 or more, or 1.15 or more, the quality of the graphene layer may be determined as good. In addition, when the contrast between the graphene and the catalyst layer is 1.5 or less, 1.45 or less, 1.4 or less, 1.35 or less, or 1.3 or less, the quality of the graphene layer may be determined as good. As described above, as the contrast between the graphene and the catalyst layer is higher, graphene having higher quality will be produced. Accordingly, in consideration of the intended use of the graphene being produced, the value of the contrast for determining the produced graphene as a good product may be changed. For example, even when the contrast between the graphene and the catalyst layer is less than 1.05, the graphene may be determined as a good product depending on the physical properties required by a consumer.

According to one embodiment of the present disclosure, in the process of continuously forming the graphene layer on the catalyst layer, the contrast between the graphene and the catalyst layer may be calculated. In addition, the carrier mobility of the produced graphene may be evaluated, and the quality of the graphene depending on the contrast may be converted into a database. Using the constructed database, the value of the contrast for determining the produced graphene to be defective may be set.

According to one embodiment of the present disclosure, the method for evaluating the quality of graphene may further include a step of subsequently treating the graphene determined to be defective. As described above, in the process of continuously forming the graphene layer on the catalyst layer, the contrast between the graphene and the catalyst layer may be calculated, and a graphene layer portion determined to be defective in quality may be subsequently treated. For example, after a composite portion including the graphene layer portion determined to be defective is recovered and excluded from the continuous process, a new graphene layer may be formed on the graphene layer portion determined to be defective. Thereby, it is possible to further increase the efficiency with which graphene is produced using the roll-to-roll process, by excluding the graphene layer portion determined to be defective before a subsequent step of the roll-to-roll process is performed. In addition, since the graphene layer portion determined to be defective may be recovered during the graphene synthesis step and produced again as a good-quality graphene layer, the production cost of graphene may be reduced.

Hereinafter, the present disclosure will be described in detail with reference to examples. However, the examples according to the present disclosure may be modified into various different forms, and the scope of the present disclosure is not interpreted as being limited to the examples described below. The examples of the present specification are provided to more completely explain the present disclosure to those skilled in the art.

Hereinafter, the present disclosure will be described in detail with reference to examples.

EXAMPLE 1

Graphene was synthesized on a 25 μm-thick copper foil (purity: 99.7%) by chemical vapor deposition (CVD). Specifically, a gaseous mixture of hydrogen and methane gases (5 sccm $H_2$/80 sccm $CH_4$) was injected into a quartz tube furnace containing a copper foil, and heated to a temperature of 1,000° C. under a pressure of 30 mTorr. Next, the copper foil was annealed for 30 minutes in a hydrogen atmosphere to form a graphene layer on the copper foil, thereby producing a specimen for imaging. In this case, the injection time (graphene synthesis time) of the gaseous mixture was about 13 minutes.

The specimen for imaging was excited using an $Ar^+$ laser having an excitation power of 120 mW, a wavelength of 514 nm and a spot size of 1 μm.

A planar image of the specimen was obtained using a confocal laser scanning microscope (Carl Zeiss, LSM 710) in reflection mode. Specifically, an objective lens (N.A=1.30) with a magnification of 100× was used, and the specimen was loaded on a stage covered with a glass microscope slide. The distance between the specimen surface and the objective lens was adjusted to compensate for chromatically different focal distances, and the confocal laser scanning microscope was operated with the pinhole open.

At this time, the surface of the specimen was irradiated with laser light having a wavelength of 405 nm, and a planar image of the specimen was obtained by detecting a signal of light reflected from the surface of the specimen. At this time, a planar image file was extracted and analyzed through ZEN (black edition) and ZEN (blue edition) programs, and was additionally analyzed using adobe Photoshop CC 2018.

EXAMPLE 2

A planar image of a specimen was obtained using the confocal laser scanning microscope in reflection mode in the same manner as in Example 1, except that the injection time of the gaseous mixture during synthesis of the graphene was set to 10 minutes.

EXAMPLE 3

A planar image of a specimen was obtained using the confocal laser scanning microscope in reflection mode in the same manner as in Example 1.

Thereafter, a predetermined area was selected from the obtained planar image, and a grayscale histogram was prepared by analyzing the grayscale in the selected area using the LSM 710 ZEN software (Carl Zeiss). Thereafter, the contrast between graphene and the copper foil in the selected area was calculated from the grayscale histogram using the ratio between the peak points of the histogram.

EXAMPLE 4

A planar image, a grayscale histogram and a contrast for a specimen were obtained in the same manner as in Example 3, except that the wavelength of laser light with which the specimen surface was irradiated was controlled to 488 nm.

EXAMPLE 5

A planar image, a grayscale histogram and a contrast for a specimen were obtained in the same manner as in Example 3, except that the wavelength of laser light with which the specimen surface was irradiated was controlled to 543 nm.

EXAMPLE 6

A planar image of a specimen was obtained using the confocal laser scanning microscope in reflection mode in the same manner as in Example 1, except that the specimen for imaging was produced using a graphene synthesis temperature of 700° C.

Thereafter, a predetermined area was selected from the obtained planar image, and a planar image file was extracted and analyzed through ZEN (black edition) and ZEN (blue edition) programs. Additionally, a grayscale line profile was prepared by analyzing the gray scale in the selected area using adobe Photoshop CC 2018. The contrast between graphene and copper in the selected area was determined by calculating the ratio between the gray scale at the top (peak) and the gray scale at the bottom in the prepared grayscale line profile.

In addition, using a Renishaw micro-Raman spectroscopy system, a Raman spectrum of the specimen was obtained. From the obtained Raman spectrum, the 2D full width at half maximum (FWHM) and the D/G intensity ratio were extracted.

EXAMPLE 7

A specimen for imaging was produced in the same manner as in Example 1, except that the synthesis temperature of the graphene was set to 800° C.

Thereafter, a planar image, a grayscale line profile and a contrast for the specimen were obtained in the same manner as in Example 6. In addition, a Raman spectrum, a 2D full width at half maximum (FWHM) and a D/G intensity ratio for the specimen were obtained in the same manner as in Example 6.

EXAMPLE 8

A specimen for imaging was produced in the same manner as in Example 1.

Thereafter, a planar image, a grayscale line profile and a contrast for the specimen were obtained in the same manner as in Example 6. In addition, a Raman spectrum, a 2D full width at half maximum (FWHM) and a D/G intensity ratio for the specimen were obtained in the same manner as in Example 6.

EXAMPLE 9

A planar image of a specimen was obtained using the confocal laser scanning microscope in reflection mode in the same manner as in Example 1, except that the pinhole was closed.

EXAMPLE 10

A specimen for imaging was produced in the same manner as in Example 1, except that the injection time of the gaseous mixture during synthesis of the graphene was set to about 12 minutes.

Thereafter, a planar image, a grayscale histogram and a contrast for the specimen were obtained in the same manner as in Example 3. In addition, a Raman spectrum of the specimen was obtained in the same manner as in Example 6.

EXAMPLE 11

A graphene layer was formed on a copper foil in the same manner as in Example 1. Then, using the SNTEK RIE etching system, the graphene layer was doped with nitrogen by treating the graphene surface on the copper foil with nitrogen plasma for 5 seconds in a nitrogen (purity: 99.999%) atmosphere at a pressure of 120 mTorr, thereby producing a specimen for imaging.

Thereafter, a planar image, a grayscale histogram and a contrast for the specimen were obtained in the same manner as in Example 3, except that the pinhole was opened and the wavelength of laser light with which the specimen surface was irradiated was controlled to 405 nm. In addition, a Raman spectrum of the specimen was obtained in the same manner as in Example 6. Furthermore, the N1s XPS peak was obtained by x-ray photoelectron spectroscopy (XPS) measurement on a Thermo Scientific Sigma Probe ESCA spectrometer using a monochromic Al x-ray source.

Reference Example 1

Figure 3:
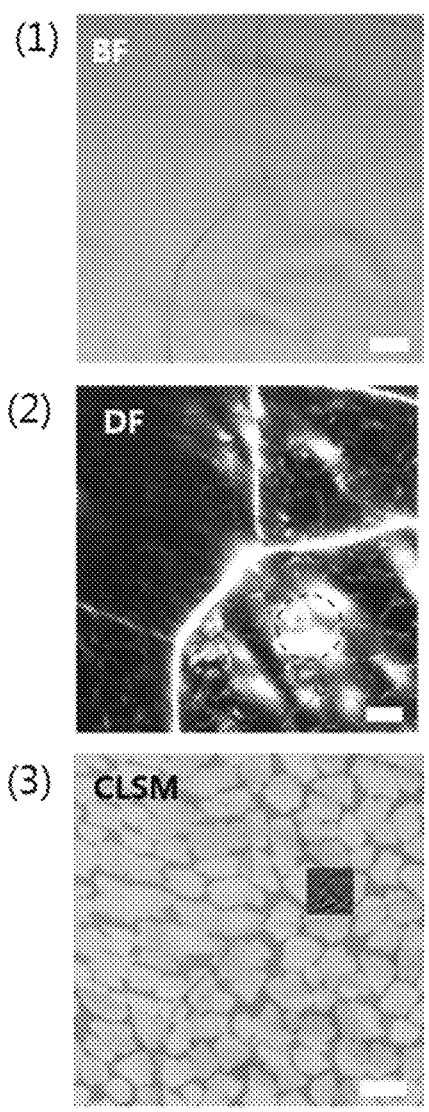
FIG. 3 is a view showing an image taken by an optical microscope and an image taken by a confocal laser scanning microscope for the same area of a specimen.

Using an atomic force microscope (AFM, Park System, XE-100 model), an AFM image of a specimen area indicated by the red box in (3) of FIG. 3 was obtained. At this time, the size of the area indicated by the red box was 10×10 $\mu m^2$, and the AFM was operated in non-contact mode with a scanning rate of 0.3 Hz.

Reference Examples 2 to 5

Specimens for imaging were produced in the same manner as in Example 1, except that a nickel foil was used instead of the copper foil as the catalyst layer and the temperature during graphene synthesis by chemical vapor deposition was controlled to 835° C.

Thereafter, planar images of the specimens were obtained using the confocal laser scanning microscope in reflection mode in the same manner as in Example 1, except that the surface of each specimen was irradiated with each of laser lights having wavelengths of 405 nm (Reference Example 2), 488 nm (Reference Example 3), 543 nm (Reference Example 4) and 633 nm (Reference Example 5).

Reference Examples 6 to 9

Specimens for imaging were produced in the same manner as in Example 1, except that a palladium foil was used instead of the copper foil as the catalyst layer and the temperature during graphene synthesis by chemical vapor deposition was controlled to 1,000° C.

Thereafter, planar images of the specimens were obtained using the confocal laser scanning microscope in reflection mode in the same manner as in Example 1, except that the surface of each specimen was irradiated with each of laser lights having wavelengths of 405 nm (Reference Example 6), 488 nm (Reference Example 7), 543 nm (Reference Example 8) and 633 nm (Reference Example 9).

Comparative Example 1

A specimen for imaging was produced in the same manner as in Example 1, and a bright field image of the specimen was obtained using an optical microscope (Olympus CX41) in bright field mode.

Comparative Example 2

A specimen for imaging was produced in the same manner as in Example 1, and a dark field image of the specimen was obtained using an optical microscope (Olympus CX41) in dark field mode.

Comparative Example 3

A planar image of a specimen was obtained using the confocal laser scanning microscope in reflection mode in the same manner as in Example 1, except that the injection time of the gaseous mixture during synthesis of the graphene was set to 30 minutes (that is, the graphene synthesis time was controlled to 30 minutes).

Comparative Example 4

A planar image, a grayscale histogram and a contrast for a specimen were obtained in the same manner as in Example 3, except that the wavelength of laser light with which the specimen surface was irradiated was controlled to 633 nm.

Experimental Example 1: Comparison of Planar Images of Graphene Layer

FIG. 3 is a view showing an image taken by an optical microscope and an image taken by a confocal laser scanning microscope for the same area of a specimen. Specifically, (1) of FIG. 3 is an image of a specimen, taken using an optical microscope in bright field mode according to Comparative Example 1, (2) of FIG. 3 is an image of the specimen, taken using an optical microscope in dark field mode according to Comparative Example 2, and (3) of FIG. 3 is an image of the specimen, taken using a confocal laser scanning microscope in reflection mode according to Example 1. The length of the scale bar in each of (1) to (3) of FIG. 3 corresponds to 10 µm.

Referring to FIG. 3, it can be seen that, in the bright field image and dark field image of the specimen, taken using the optical microscope, it is difficult to distinguish between the copper foil, which is the catalyst layer, and the synthesized graphene. Referring to (1) of FIG. 3, it can be seen that, in the bright field image taken using the optical microscope, the graphene partially grown on the copper foil is hardly distinguished from non-oxidized copper.

Meanwhile, referring to (2) of FIG. 3, it can be seen that, in the dark field image of the specimen, taken using the optical microscope, the edge portion of graphene is highlighted, and the grain boundary and protruding surface of copper are brightened by Rayleigh scattering, and thus it is difficult to distinguish between the copper foil and graphene.

On the other hand, referring to (3) of FIG. 3, it can be seen that, in the image obtained using the confocal laser scanning microscope in reflection mode, the synthesized graphene appears bright, and the copper foil appears dark, indicating that the synthesized graphene and the copper foil are clearly distinguished from each other.

That is, it was confirmed that, in the image for the same specimen, taken the conventional optical microscope for the same specimen, it was difficult to distinguish between the catalyst layer and the synthesized graphene, but in the image for the same specimen, taken using the confocal laser scanning microscope according to one embodiment of the present disclosure, the catalyst layer and the synthesized graphene were clearly distinguished from each other.

Figure 4:
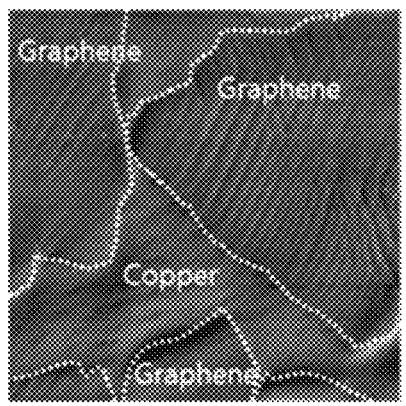
FIG. 4 shows an AFM image of the specimen area indicated by the red box in (3) of FIG. 3 and a graph showing the height gradient of each of copper and graphene in the area.
Figure 4:
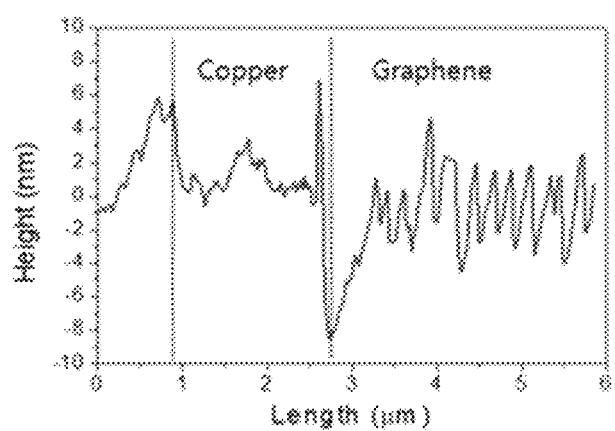

FIG. 4 shows an AFM image of the area indicated by the red box in (3) of FIG. 3 and a graph showing the height gradient of each of copper and graphene in the area. Specifically, (1) of FIG. 4 is an AFM image which was obtained in Reference Example 1 and whose area was indicated by the red box in (3) of FIGS. 3, and (2) of FIG. 4 is a graph showing the height gradient of each of copper and graphene in the portions corresponding to the red dotted lines in (1) of FIG. 4.

Referring to FIG. 4, it could be confirmed that the surface features of the specimen and the height gradients in the portions corresponding thereto could be closely observed using the AFM. In addition, referring to (3) of FIG. 3, it could be confirmed that features showing partial growth of graphene could be schematically observed even in the image obtained using the confocal laser scanning microscope in reflection mode, and these features were similar to the features on the surface of the specimen in the AFM image shown in FIG. 4.

Figure 5:
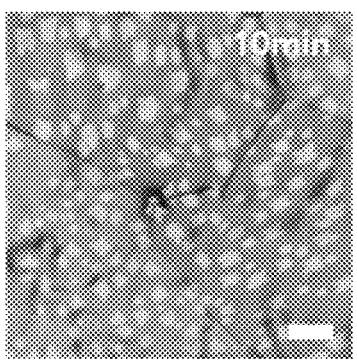
FIG. 5 is a view showing confocal laser scanning microscope images of specimens produced using different graphene synthesis times.
Figure 5:
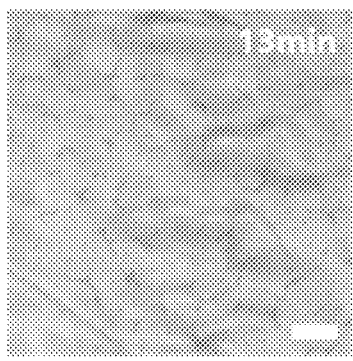
Figure 5:
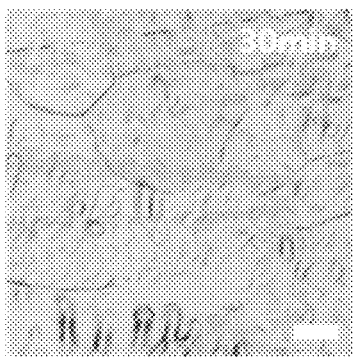

Experimental Example 2: Analysis of Planar Images of Graphene Layers Formed Using Different Graphene Synthesis Times FIG. 5 is a view showing confocal laser scanning microscope images of specimens produced using different graphene synthesis times. Specifically, (1) of FIG. 5 is an image obtained by the confocal laser scanning microscope in reflection mode for the specimen produced using a graphene synthesis time controlled to 10 minutes according to Example 2; (2) of FIG. 5 is an image obtained by the confocal laser scanning microscope in reflection mode for the specimen produced using a graphene synthesis time controlled to 13 minutes according to Example 1; and (3) of FIG. 5 is an image obtained by the confocal laser scanning microscope in reflection mode for the specimen produced using a graphene synthesis time controlled to 30 minutes according to Comparative Example 3. The length of the scale bar in each of (1) to (3) of FIG. 5 corresponds to 10 µm.

Referring to FIG. 5, it can be seen that the graphene area covering the surface of the copper foil increased as the graphene synthesis time increased. Referring to (1) of FIG. 5, it could be confirmed that, in the case of Example 2, graphene appeared bright and the copper foil appeared dark, indicating that the contrast therebetween was clear. In addition, referring to FIG. 5 (2), it could be confirmed that, in the case of Example 1, graphene was synthesized on a large portion of the surface of the copper foil, but the contrast between the copper foil appearing dark and the graphene appearing bright was possible. However, referring to (3) of FIG. 5, it could be confirmed that, in the case of Comparative Example 3 in which the graphene synthesis time was 30 minutes, graphene was synthesized on the entire surface of the copper foil, and thus the contrast between the graphene and the copper foil was impossible.

Figure 6:
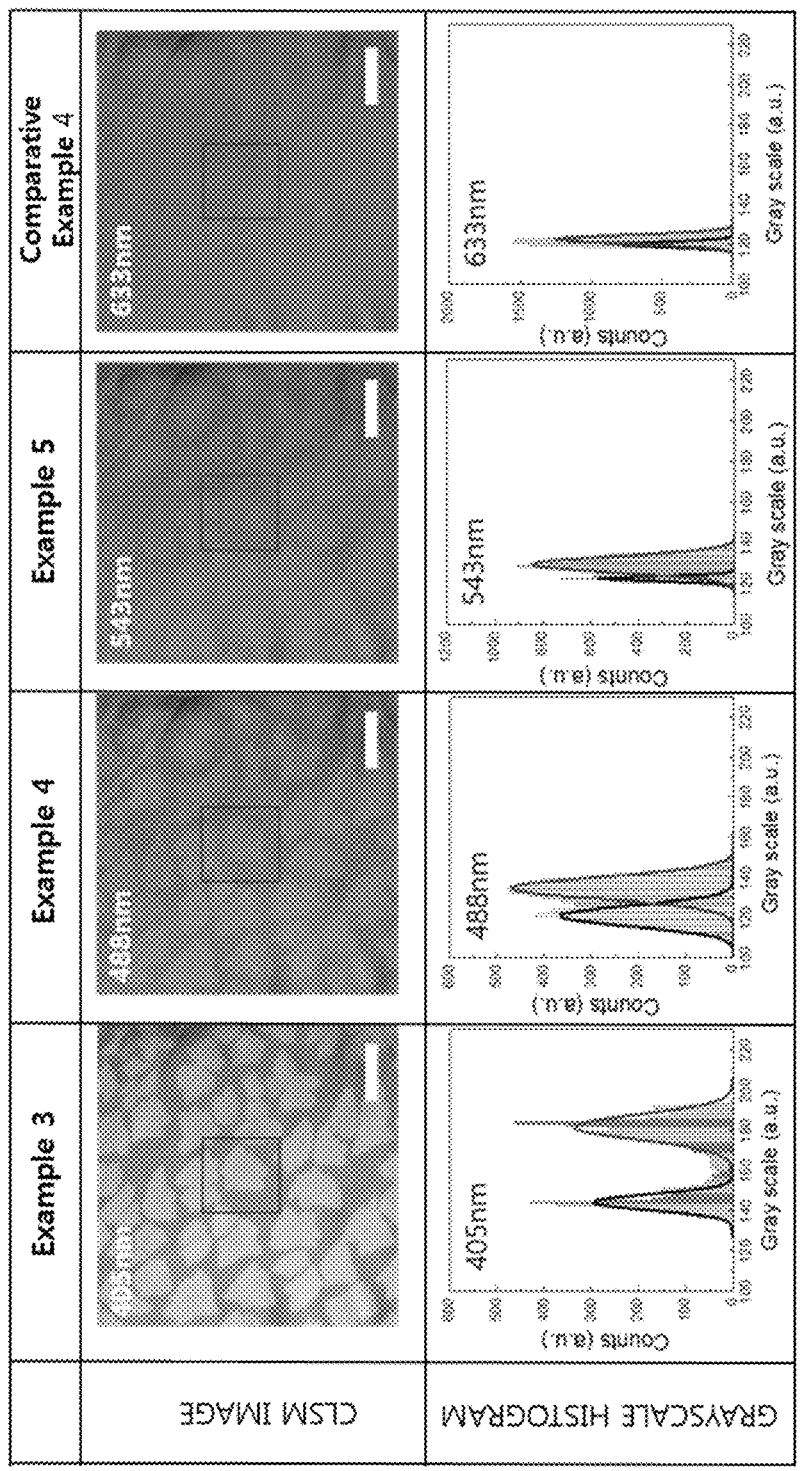
FIG. 6 is a view showing planar images of a specimen, taken by a confocal laser scanning microscope while irradiating the specimen with laser light at different wavelengths, and grayscale histograms obtained from the planar images.

Experimental Example 3: Analysis of Contrast Between Graphene and Catalyst Layer Depending on Wavelength of Laser Light FIG. 6 is a view showing planar images of a specimen, taken by the confocal laser scanning microscope while irradiating the specimen with laser light at different wavelengths, and grayscale histograms obtained from the planar images. The length of the scale bar in each of the CLSM images of FIG. 6 corresponds to 10 µm.

Specifically, FIG. 6 shows planar images (CLSM images) of the same specimen, obtained by irradiating the specimen with laser light at different wavelengths in Examples 3 to and Comparative Example 4. In addition, FIG. 6 shows grayscale histograms prepared by analyzing the grayscale in the area indicated by the red box in each of the planar images. In the grayscale histograms, the black Gaussian curve corresponds to copper, and the red Gaussian curve corresponds to graphene.

Referring to FIG. 6, it can be confirmed that the contrast between graphene and copper in the obtained planar image changed depending on the wavelength of the laser light with which the same specimen was irradiated. Specifically, it was confirmed that, in the case of Comparative Example 4 in which the wavelength of the laser light with which the specimen was irradiated was 633 nm, copper and graphene in the planar image were not distinguished from each other, and even on the grayscale histogram, the Gaussian curve of copper and the Gaussian curve of graphene overlapped each other.

On the other hand, it was confirmed that, in the case of Examples 3 to 5 in which the wavelength of the laser light with which the specimen was irradiated satisfies the range of 400 nm to 550 nm, copper and graphene in the planar image were distinguished from each other, and even on the grayscale histogram, the Gaussian curve of copper and the Gaussian curve of graphene were distinguished from each other. In particular, it was confirmed that, in Examples 3 and 4, copper and graphene were more clearly distinguished from each other, and in Example 3, copper and graphene were most clearly distinguished from each other.

Figure 7:
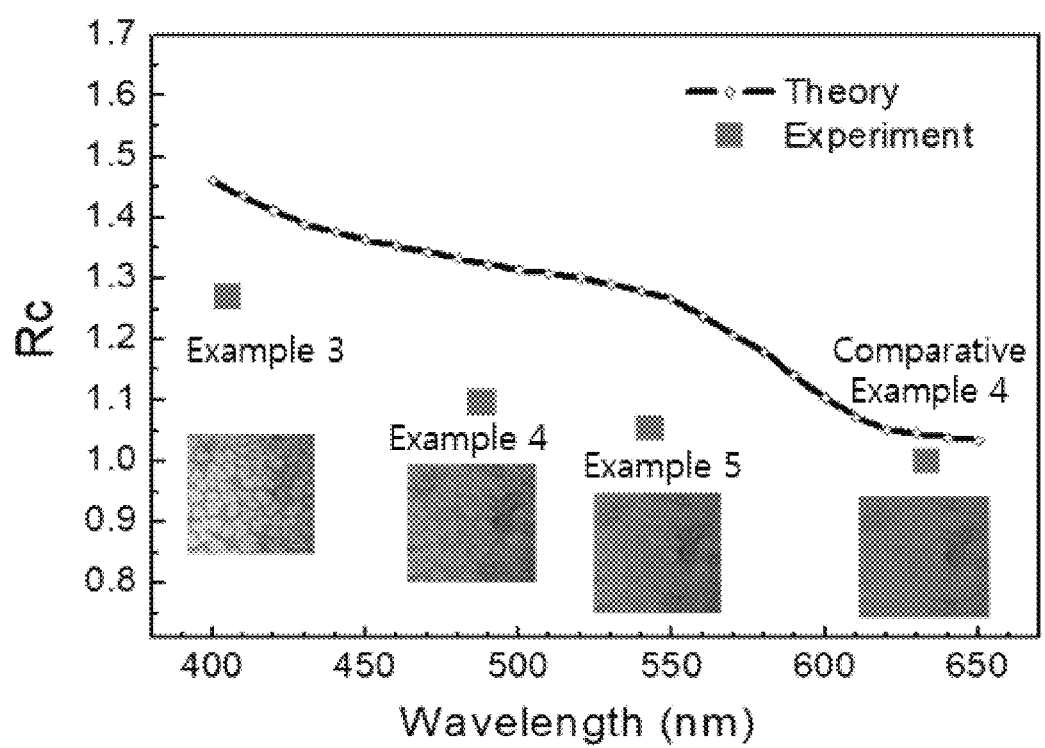
FIG. 7 is a graph showing the theoretical contrast between graphene and copper and the contrast between graphene and copper calculated in each of Examples 3 to 5 and Comparative Example 4.

FIG. 7 is a graph showing the theoretical contrast between graphene and copper and the contrast between graphene and copper calculated in each of Examples 3 to 5 and Comparative Example 4. Specifically, FIG. 7 shows the contrast between graphene and copper, calculated based on each of the grayscale histograms shown in FIG. 6. In addition, FIG. 7 also shows the contrast between graphene and copper, theoretically calculated as a function of the wavelength of the laser light with which the specimen was irradiated.

Referring to FIG. 7, it was confirmed that the contrast between graphene and copper in Example 3 was 1.260, the contrast between graphene and copper in Example 4 was 1.116, the contrast between graphene and copper in Example 5 was 1.057, and the contrast between graphene and copper in Comparative Example 4 was 1.025.

That is, it can be seen that, in Examples 3 to 5 in which the wavelength of the laser light with which the specimen was irradiated was controlled within the range of 400 nm to 550 nm according to one embodiment of the present disclosure, the contrast between graphene and copper as the catalyst layer was 1.05 or higher, suggesting that the quality of graphene formed on the catalyst layer can be effectively evaluated. However, it was confirmed that, in the case of Comparative Example 4 in which the wavelength of the laser light with which the specimen was irradiated was 633 nm, the contrast between graphene and copper was lower than 1.05, and thus it was difficult to distinguish between and analyze graphene and copper.

The theoretical contrast between graphene and copper shown in FIG. 7 was calculated as follows.

Figure 8:
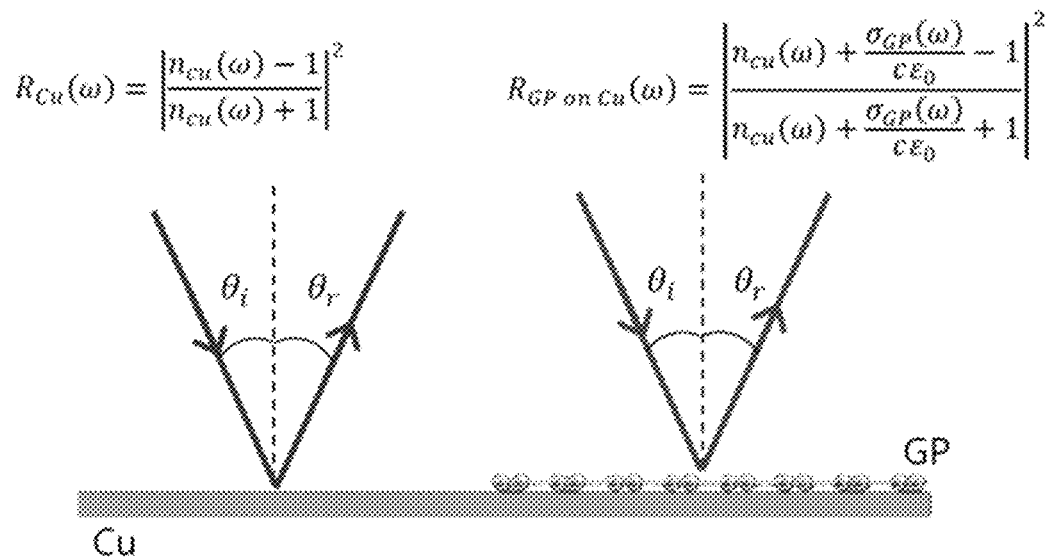
FIG. 8 is a view schematically showing conditions set to calculate the theoretical contrast between graphene and copper.

FIG. 8 is a view schematically showing conditions set to calculate the theoretical contrast between graphene and copper.

As shown in FIG. 8, in order to calculate the theoretical contrast between graphene and copper, copper and graphene layers were assumed as independent layers. To calculate the optical contrast between graphene and copper, the Fresnel's interference formula was applied as follows.

$$Rc(\omega) = \left| \frac{n_{cu}(\omega) + \frac{\sigma_{GP}(\omega)}{c\varepsilon_0} - 1}{n_{cu}(\omega) + \frac{\sigma_{GP}(\omega)}{c\varepsilon_0} + 1} \right|^2 \bigg/ \left| \frac{n_{cu}(\omega) - 1}{n_{cu}(\omega) + 1} \right|^2 \quad \text{[Equation 2]}$$

wherein $n_{cu}$ stands for the refractive index of copper, $\sigma_{GP}$ stands for the optical conductivity of graphene, $\varepsilon_0$ stands for the dielectric permittivity of vacuum, and c stands for the speed of light.

In addition, when the wavelength of the laser light with which the specimen was irradiated was 405 nm, the refractive index of copper was set to 1.3009+i2.1595; when the wavelength of the laser light with which the specimen was irradiated was 488 nm, the refractive index of copper was set to 1.2297+i2.5379; when the wavelength of the laser light with which the specimen was irradiated was 543 nm, the refractive index of copper was set to 1.0523+i2.5833; and when the wavelength of the laser light with which the specimen was irradiated was 633 nm, the refractive index of copper was set to 0.26965+i3.4106.

When the approximated optical conductivity of $$\frac{\sigma_{GP}(\omega)}{c\varepsilon_0} \sim \pi\alpha$$

is set near Dirac-cone, the optical reflectance contrast Rc yields unphysical values of less than 1. This indicates that the optical conductivities of graphene on copper have different spectra in the visible range. Therefore, in order to estimate the optical properties of graphene on copper, a tight-binding model was applied. Under the Dirac-Con approximation, up to the second-order term of the tight-binding model was considered to account for the visible range of the spectrum.

For wavelengths below 400 nm, strong carrier-carrier interaction leads to Van Hove singularity in the electronic joint density of states. Thus, the above approximation applies only within the visible spectra (E<3.1 eV) or less.

If the electronic temperature value is lower than the chemical potential (e.g., T/μ→0), the optical conductivity is Drude-like given by intraband and interband contributions (σ=σ$_{intraband}$+σ$_{interband}$). σ$_{intraband}$ and σ$_{interband}$ are as defined by the following equations.

$$\sigma_{intraband} = i\frac{e^2\mu}{\pi\hbar^2(\omega + i\gamma)} \quad \text{[Equation 3]}$$

$$\sigma_{interband} = \frac{e^2}{4\hbar}\{\theta(\hbar\omega - |2\mu|)\} + i\frac{1}{\pi}\log\left|\frac{\hbar\omega + |2\mu|}{\hbar\omega - |2\mu|}\right| \quad \text{[Equation 4]}$$

wherein e is the charge of an electron, and ℏ is Plank constant. The θ(x) in Equation 3 is Heaviside-step function, accounting for Pauli blocking. It is assumed that the collision rate is negligible compared to γ<<ω. Temperature corrections lead to real and imaginary parts of the optical conductivities.

$$\text{Re}[\sigma] = \sigma_0 \frac{\pi}{12\sqrt{3}} \frac{t^2}{\hbar\omega} p\left(\frac{\hbar\omega}{2}\right) \quad \text{[Equation 5]}$$

$$\left(18 - \left(\frac{\hbar\omega}{t}\right)^2\right) \times \left[\tanh\frac{\hbar\omega + 2\mu}{4k_BT} + \tanh\frac{\hbar\omega - 2\mu}{4k_BT}\right],$$

$$\text{Im}[\sigma] \approx \sigma_0 \frac{\pi}{3 \cdot \sqrt{3}} \frac{t^2}{\hbar\omega} \quad \text{[Equation 6]}$$

$$\text{Re}\left[\int_0^{3t} dE\rho(E)g\left(\frac{E}{t}\right)[f_{FD}(-E) - f_{FD}(E)]\frac{4E}{(\hbar\omega + i0^-)^2 - (2E)^2}\right]$$

In Equations 5 and 6 above, σ$_0$ is e²/4ℏ, is which is termed the ac universal conductivity of the graphene, is the hopping parameter connecting first-nearest neighbors with the value of the order 3 eV, k$_B$ the Boltzmann constant, and ρ(E) stands for the density of states per spin per unit cell. f$_{FD}$(x) is 1/(e$^{(x-\mu)/k_BT}$+1), which corresponds to the Fermi-Dirac function. In addition, g(X) is defined as 18-4x².

Figure 9:
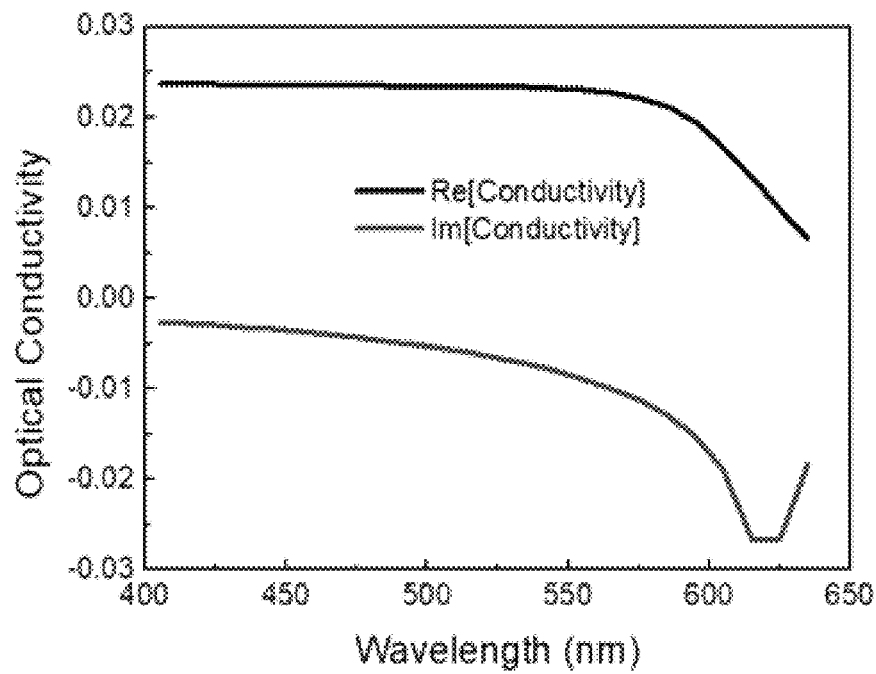
FIG. 9 is a graph showing the optical conductivity of graphene calculated according to Equations 5 and 6.

FIG. 9 is a graph showing the optical conductivity of graphene calculated according to Equations 5 and 6. Specifically, FIG. 9 shows the values obtained by calculating the real optical conductivity of graphene synthesized on copper by Equation 5, and the values obtained by calculating the imaginary optical conductivity of graphene synthesized on copper by Equation 6, when the graphene was irradiated with laser light having a wavelength of 405 nm to 633 nm.

Using Equations 5 and 6, the reflectance contrast between graphene synthesized on copper and the copper was calculated. When the wavelength of the laser light with which the specimen was irradiated was 405 nm, the contrast between graphene and copper was calculated to be 1.447; when the wavelength of the laser light with which the specimen was irradiated was 488 nm, the contrast between graphene and copper was calculated to be 1.326; the wavelength of the laser light with which the specimen was irradiated was 543 nm, the contrast between graphene and copper was calculated to be 1.277; and when the wavelength of the laser light with which the specimen was irradiated was 633 nm, the contrast between graphene and copper was calculated to be 1.043.

As shown in FIG. 7, it was confirmed that the tendency of the contrast between graphene and copper calculated by applying the above-described theory was similar to the tendency of the actual contrast measured in each of Examples 3 to 5 and Comparative Example 4, suggesting that the contrast between graphene and copper calculated by applying the above-described theory is valid.

Meanwhile, referring to FIG. 7, it was confirmed that there was a slight difference between the contrast measured in each of Examples 3 to 5 and the contrast calculated by applying the theory. It is determined that this difference is attributed to the fact that the synthesized graphene has some atomic defect and tensile strain caused by the different thermal expansion coefficients of graphene and copper, providing a lower optical conductivity than the ideal value.

Experimental Example 4: Analysis of Contrast and Carrier Mobility of Graphene Depending on Graphene Synthesis Temperature FIG. 10 is a view showing planar images of specimens, taken by a confocal laser scanning microscope for graphenes produced at different synthesis temperatures, and grayscale line profiles obtained from the planar images.

Figure 10:
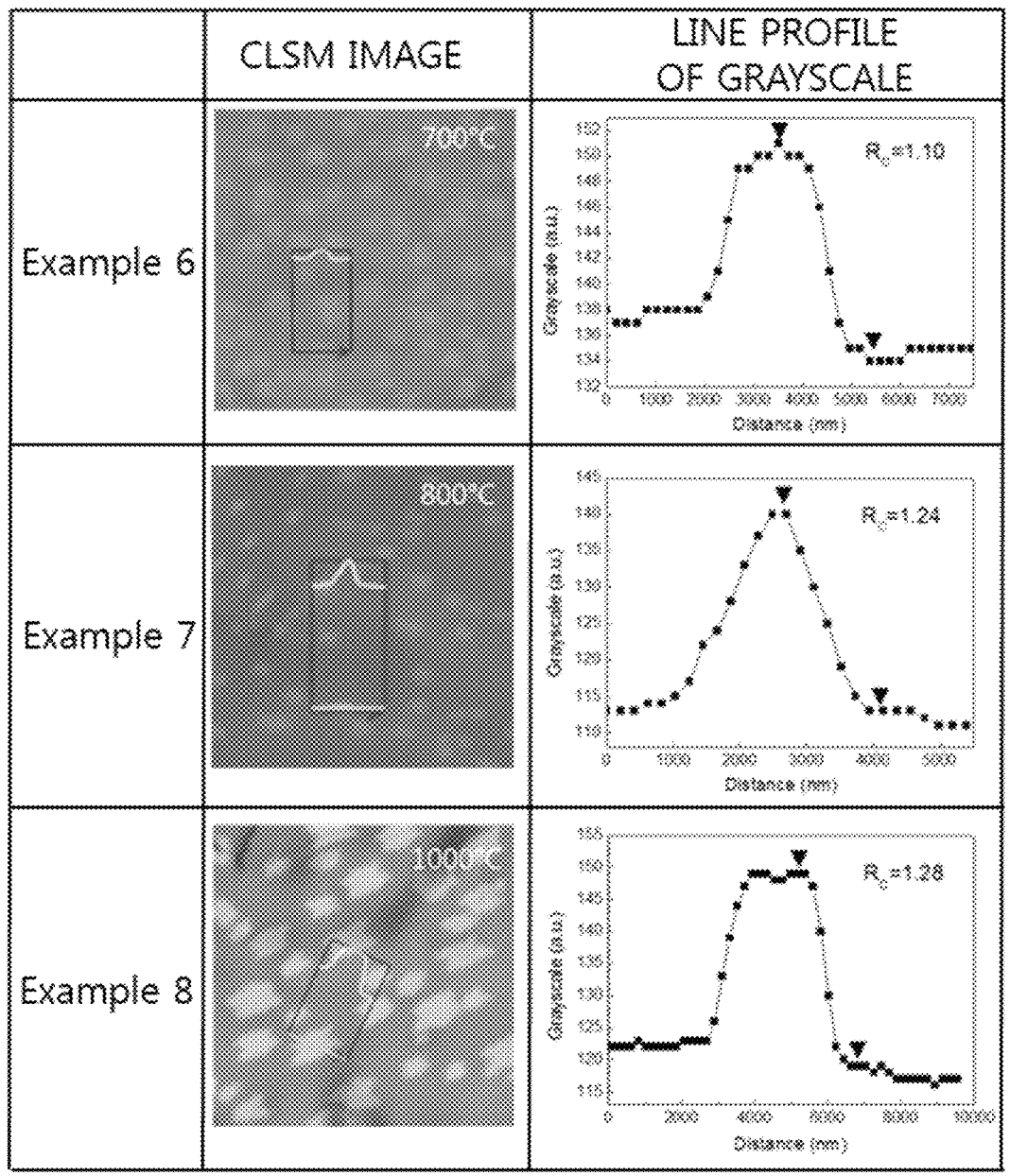
FIG. 10 is a view showing planar images of specimens, taken by a confocal laser scanning microscope for graphenes produced at different synthesis temperatures, and grayscale line profiles obtained from the planar images.

Specifically, FIG. 10 shows planar images of specimens, taken by the confocal laser scanning microscope for the graphenes produced in Example 6 in which the graphene synthesis temperature was 700° C., Example 7 in which the graphene synthesis temperature was 800° C., and Example 8 in which the graphene synthesis temperature was 1,000° C. In addition, FIG. 10 also shows grayscale line profiles prepared by analyzing the gray scale in the area indicated by the red box in each of the planar images.

Referring to FIG. 10, the contrast between graphene and copper in the red boxed area was obtained by calculating the ratio between the gray scale at the top (peak) and the gray scale at the bottom in each of the grayscale line profiles of Examples 6 to 8. At this time, the top (peak) and the bottom were pointed by inverted triangles in the grayscale line profiles of FIG. 10.

Referring to FIG. 10, the contrast between graphene and copper as the catalyst layer in Example 6, was 1.10, the contrast between graphene and copper as the catalyst layer in Example 7 was 1.24, and the contrast between graphene and copper as the catalyst layer in Example 8 was 1.28. It was confirmed that the contrast between graphene and copper increased as the graphene synthesis graphene increased. In particular, it was confirmed that the contrast between graphene and copper was 1.20 or higher when the graphene synthesis temperature was 800° C. or higher.

Figure 11:
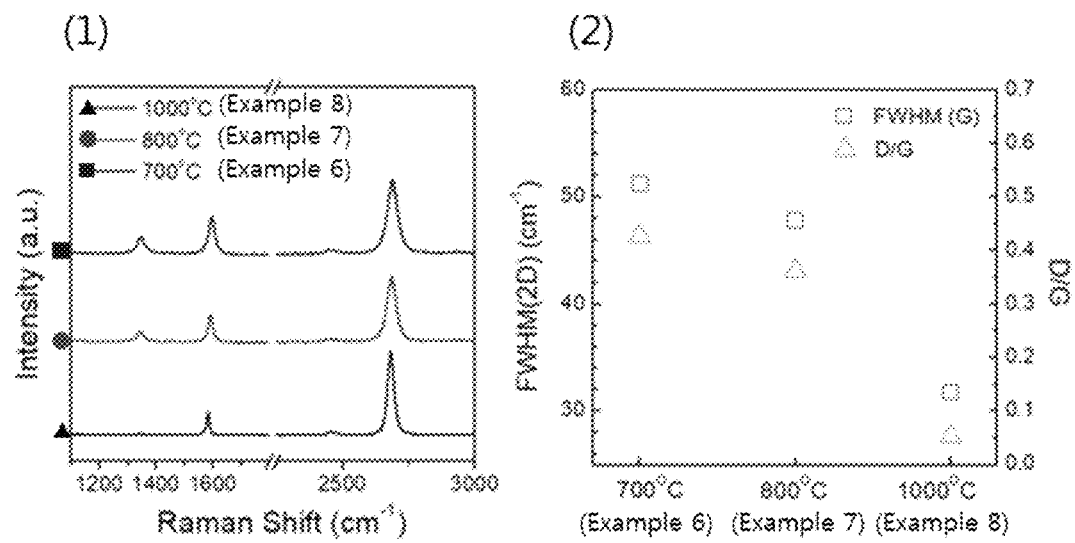
FIG. 11 depicts a graph showing the Raman spectrum of each of the graphenes produced in Examples 6, 7 and 8 of the present disclosure, and a graph showing the full width at half maximum (FWHM) and D/G intensity ratio of each of the graphenes.

FIG. 11 depicts a graph showing the Raman spectrum of each of the graphenes produced in Examples 6, 7 and 8 of the present disclosure, and a graph showing the full width at half maximum (FWHM) and D/G intensity ratio of each of the graphenes. Specifically, (1) of FIG. 11 shows Raman spectra of the graphenes produced in Example 6 in which the graphene synthesis temperature was 700° C., Example 7 in which the graphene synthesis temperature was 800° C., and Example 8 in which the graphene synthesis temperature was 1,000° C. (2) of FIG. 11 shows the 2D full width at half maximum (FWHM) and D/G intensity ratio of graphene, extracted from each of the Raman spectra obtained in Examples 6, 7 and 8.

Referring to FIG. 11, it was confirmed that, as the graphene synthesis temperature increased, the 2D full width at half maximum (FWHM) and D/G intensity ratio of the graphene decreased.

It has been demonstrated that the carrier mobility of synthesized graphene is closely related to the 2D FWHM and can be estimated by the empirical equation as a function of the 2D FWHM (Robinson, J. A.; Wetherington, M.; Tedesco, J. L.; Campbell, P. M.; Weng, X.; Stitt, J.; Fanton, M. A.; Frantz, E.; Snyder, D.; VanMil, B. L. Correlating Raman spectral signatures with carrier mobility in epitaxial graphene: a guide to achieving high mobility on the wafer scale. Nano letters 2009, 9, 2873-2876).

Following this, the carrier mobility of the graphene produced in each of Examples 6 to 8 was calculated from the 2D FWHM of the graphene. The carrier mobility of the graphene produced in Example 6 was 357 $cm^2$/Vs, the carrier mobility of the graphene produced in Example 7 was 619 $cm^2$/Vs, and the carrier mobility of the graphene produced in Example 8 was 8,105 $cm^2$/Vs. It was confirmed that, as the graphene synthesis temperature increased, the carrier mobility of the produced graphene increased. In particular, it can be seen that the graphene synthesized in Example 8 at a temperature of 1,000° C. had the best carrier mobility.

Figure 12:
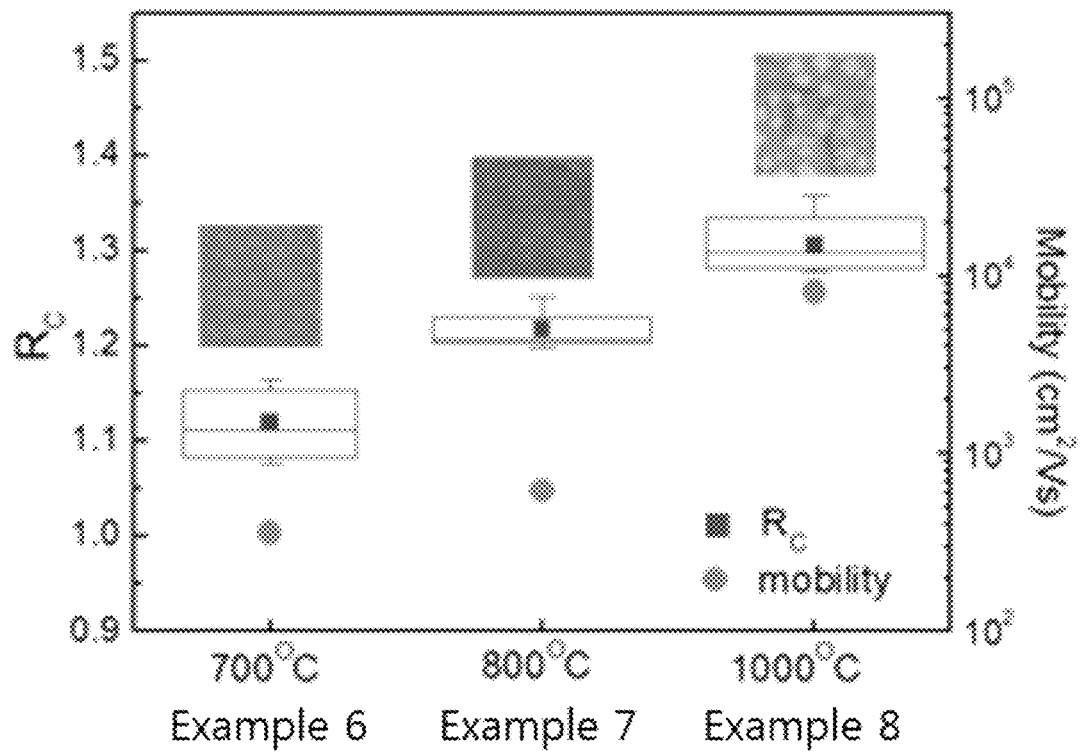
FIG. 12 is a view showing the contrast between graphene and copper and the carrier mobility of graphene in each of the specimens produced in Examples 6, 7, and 8 of the present disclosure.

FIG. 12 is a view showing the contrast between graphene and copper and the carrier mobility of graphene in each of the specimens produced in Examples 6, 7, and 8 of the present disclosure.

Referring to 12, it was confirmed that, as the graphene synthesis temperature increased, the contrast between graphene and copper in the specimen and the carrier mobility of graphene increased. In particular, it was confirmed that the carrier mobility also increased when the contrast increased. Thereby, it can be seen that the carrier mobility of the produced graphene can be evaluated by calculating the contrast of the graphene produced on the catalyst layer.

Figure 13:
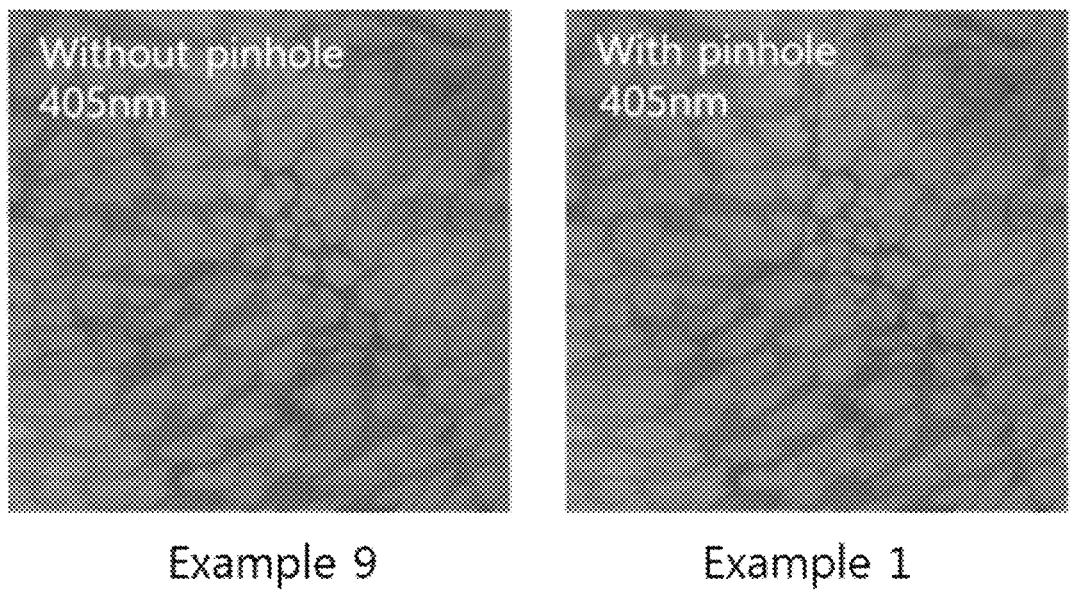
FIG. 13 is a view showing images taken by a confocal laser scanning microscope according to Examples 1 and 9 of the present disclosure.

Experimental Example 5: Analysis of Planar Image Using Confocal Laser Scanning Microscope With or Without Pinhole FIG. 13 is a view showing images taken by the confocal laser scanning microscope according to Examples 1 and 9 of the present disclosure. Specifically, FIG. 13 is a planar image of the specimen obtained in Example 9 in which the confocal laser scanning microscope was operated with the pinhole closed, and a planar image of the specimen obtained in Example 1 in which the confocal laser scanning microscope was operated with the pinhole open. At this time, the planar image according to Example 3 shown in FIG. 6 corresponds to an enlarged portion of the planar image according to Example 1 shown in FIG. 13.

Referring to FIG. 13, it was confirmed that, when the same specimen was irradiated with laser light having the same wavelength (405 nm), the planar image obtained in Example 1 and the planar image obtained in Example 9 were substantially identical without significant difference. That is, it can be seen that, when the same specimen was irradiated with laser light having the same wavelength, the same level of planar images of the specimen could be obtained regardless of opening and closing of the pinhole.

Therefore, it can be seen that the method for evaluating the quality of graphene according to one embodiment of the present disclosure can omit the process of setting the pinhole, thereby effectively reducing the time for evaluating the quality of the graphene and lowering the difficulty therefor.

Figure 14:
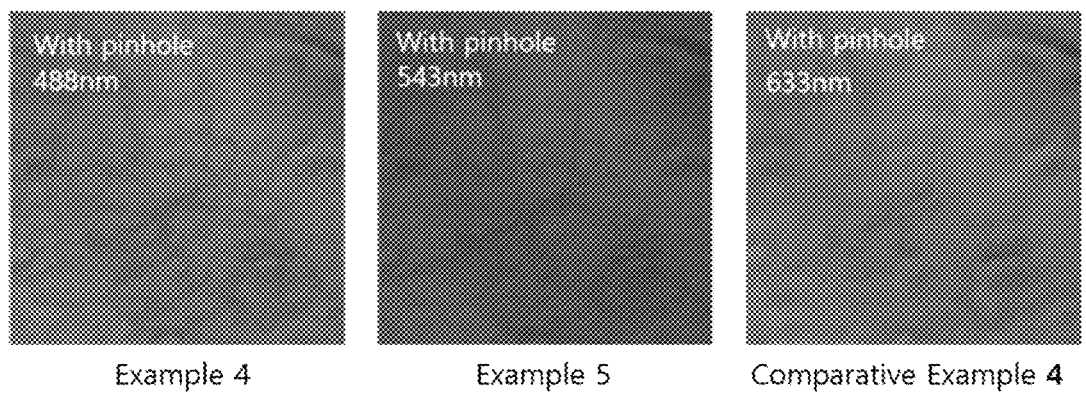
FIG. 14 is a view showing images taken by a confocal laser scanning microscope according to Examples 4 and 5 of the present disclosure and Comparative Example 4.

FIG. 14 is a view showing images taken by the confocal laser scanning microscope according to Examples 4 and 5 of the present disclosure and Comparative Example 4. At this time, the planar images according to Example 4, Example 5 and Comparative Example 4 shown in FIG. 6 correspond to enlarged portions of the planar images according to Example 4, Example 5 and Comparative Example 4 shown in FIG. 14, respectively.

Experimental Example 6: Analysis of Nitrogen-Doped Graphene Layer

Figure 15:
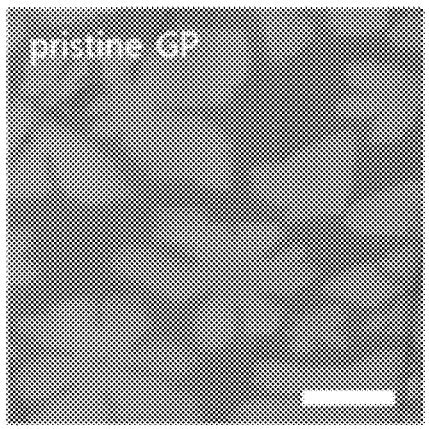
FIG. 15 is a view showing images of specimens, taken by a confocal laser scanning microscope according to Examples 10 and 11 of the present disclosure.
Figure 15:
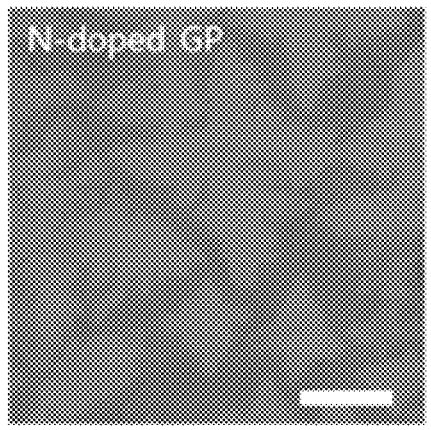

FIG. 15 is a view showing images of specimens, taken by the confocal laser scanning microscope according to Examples 10 and 11 of the present disclosure. The length of the scale bar in FIG. 15 corresponds to 10 μm.

Figure 16:
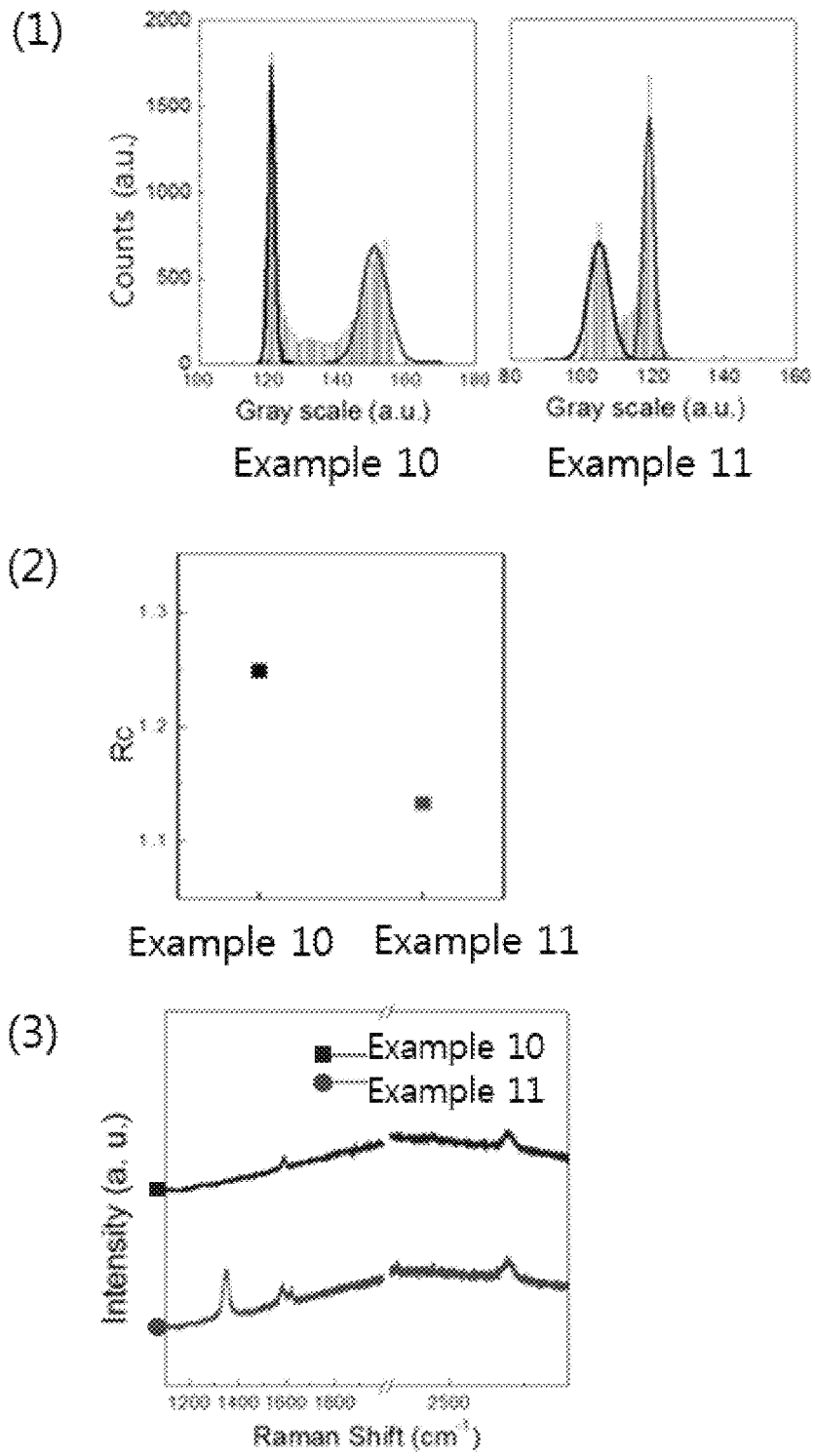
FIG. 16 is a view showing a grayscale histogram and a contrast for each of the specimens according to Examples 10 and 11 of the present disclosure, and Raman spectra of the specimens.

FIG. 16 depicts graphs showing grayscale histograms and contrasts for the specimens according to Examples 10 and 11 of the present disclosure, and Raman spectra of the specimens. Specifically, (1) of FIG. 16 shows gray scale histograms of the graphene of Example 10 and the nitrogen-doped graphene of Example 11; (2) of FIG. 16 shows the contrast of each of the graphene of Example 10 and the nitrogen-doped graphene of Example 11 to copper, and (3) of FIG. 16 shows Raman spectra of the graphene of Example 10 and the nitrogen-doped graphene of Example 11.

Referring to 15, it was confirmed that the nitrogen-doped graphene appeared bright and the copper appeared dark, suggesting that the contrast between the nitrogen-doped graphene and the copper is clear.

Referring to FIG. 16, it was confirmed that a gray scale histogram and a contrast to copper could be obtained even for the nitrogen-doped graphene. Referring to (1) and (2) of FIG. 16, it was confirmed that the contrast of the nitrogen-doped graphene (Example 11) was 1.133, and the contrast of the pristine graphene layer (Example 10) was 1.248, suggesting that the quality of the graphene can be evaluated, even though the contrast thereof is slightly low.

Figure 17:
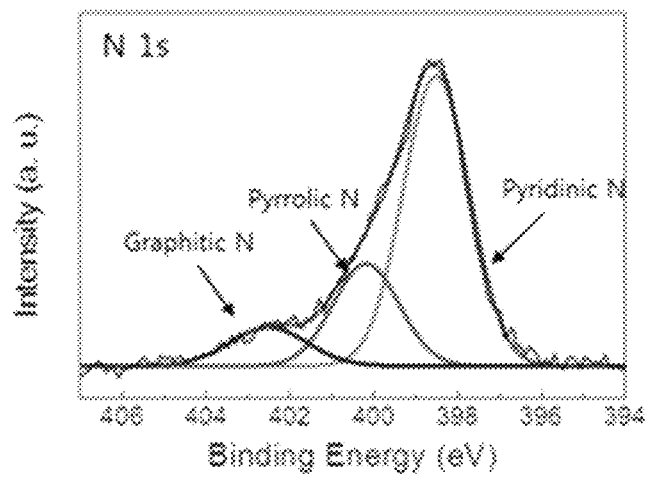
FIG. 17 is a view showing the N1s XPS peak of nitrogen-doped graphene according to Example 11 of the present disclosure.
Figure 17:
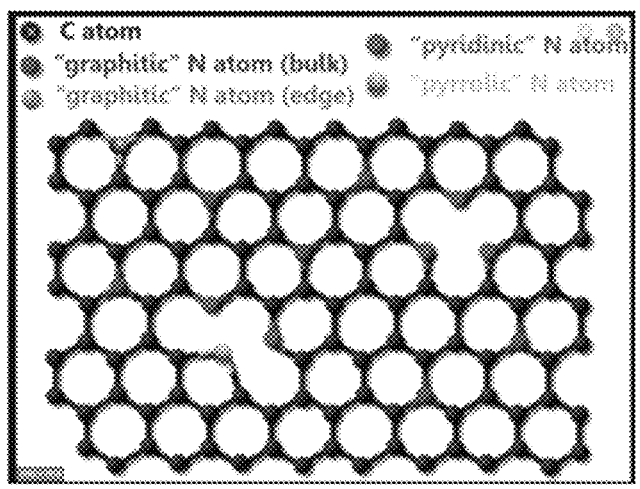

FIG. 17 is a view showing the N1s XPS peak of the nitrogen-doped graphene according to Example 11 of the present disclosure. Specifically, (1) of FIG. 17 shows the N1s XPS peak of the nitrogen-doped graphene according to Example 11, and (2) of FIG. 17 schematically shows the shape of the nitrogen-doped graphene according to Example 11.

Referring to FIG. 17, it can be confirmed that, in the case of the nitrogen-doped graphene according to Example 11, the sp2 bond of graphene was broken through plasma nitrogen doping, and the graphene was doped with each of graphitic nitrogen, pyrrolic nitrogen and pyridinic nitrogen.

Figure 18:
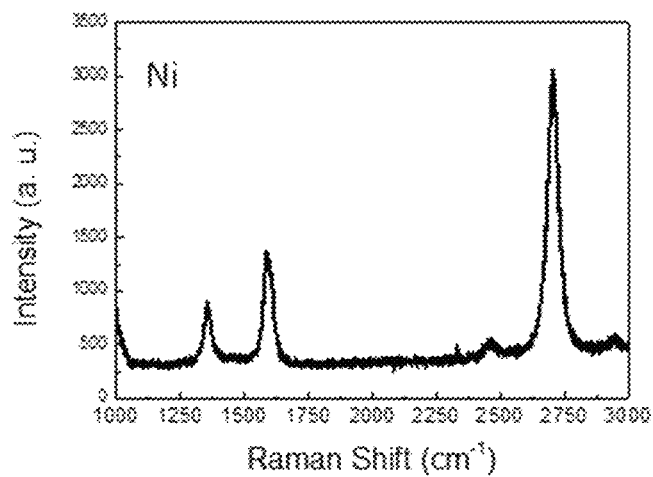
FIG. 18 is a view showing Raman spectra of the graphenes produced in Reference Example 2 and Reference Example 6.
Figure 18:
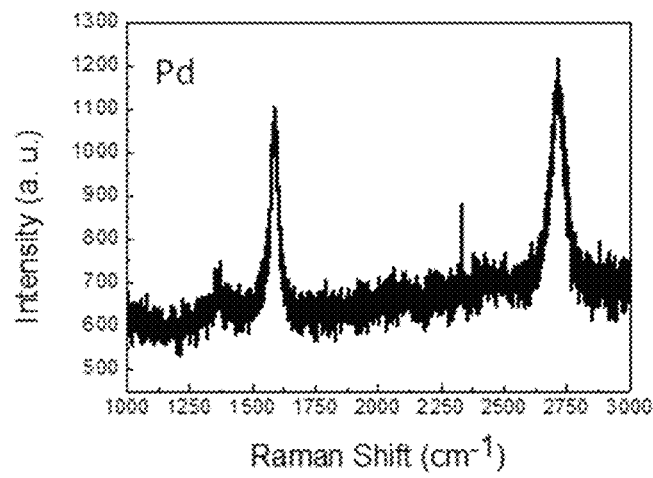

Experimental Example 7: Analysis of Planar Image depending on Type of Catalyst Layer FIG. 18 is a view showing Raman spectra of the graphenes produced in Reference Example 2 and Reference Example 6. Referring to FIG. 18, it can be confirmed that the 2D/G peak of each of graphene grown on nickel (Reference Example 2) and graphene grown on palladium (Reference Example 6) was less than 2.

Figure 19:
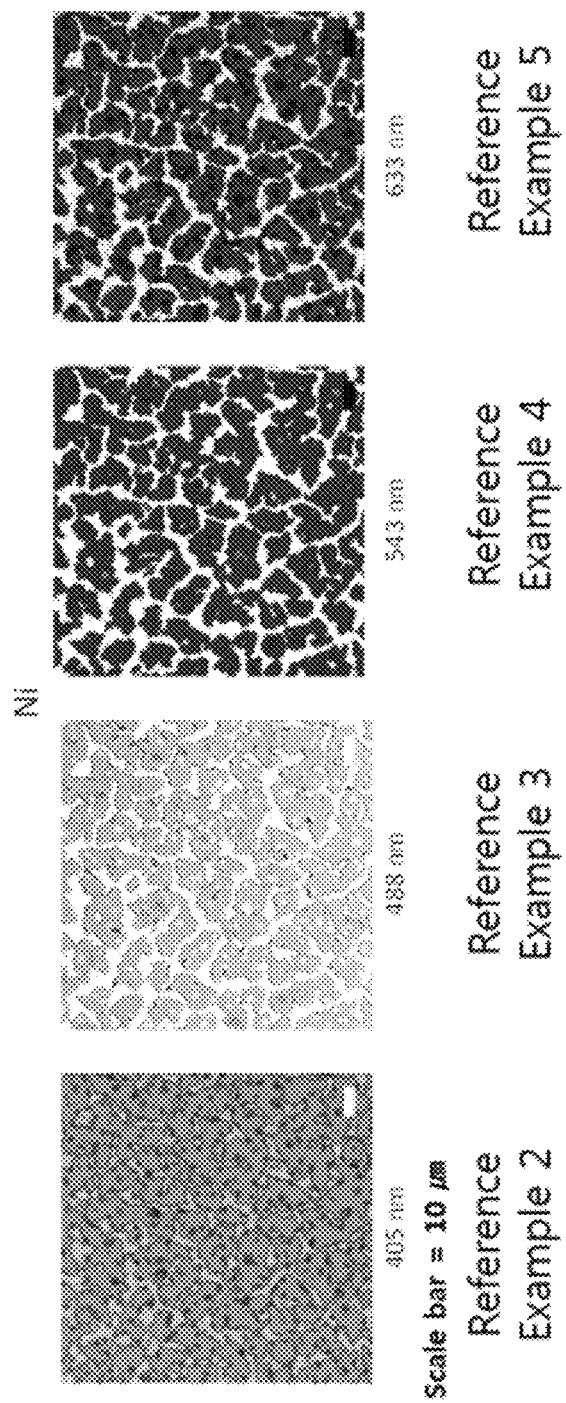
FIG. 19 is a view showing planar images of specimens, taken by a confocal laser scanning microscope for graphenes produced in Reference Examples 2 to 5.
Figure 20:
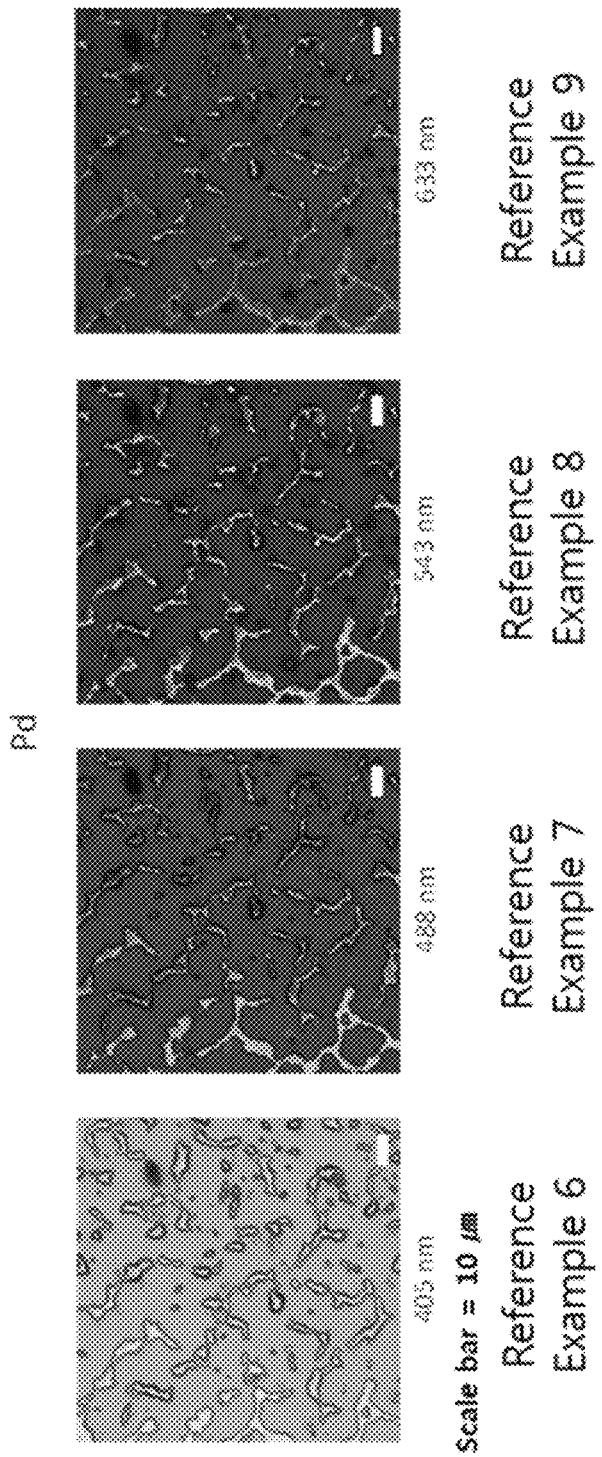
FIG. 20 is a view showing planar images of specimens, taken by a confocal laser scanning microscope for graphenes produced in Reference Examples 6 to 9.

FIG. 19 is a view showing planar images of specimens, taken by the confocal laser scanning microscope for graphenes produced in Reference Examples 2 to 5, and FIG. 20 is a view showing planar images of specimens, taken by the confocal laser scanning microscope for graphenes produced in Reference Examples 6 to 9.

Referring to FIG. 19, it can be confirmed that, in each of the images of Reference Examples 2 to 5, obtained using the confocal laser scanning microscope in reflection mode, the synthesized graphene appeared dark, and the nickel appeared bright, indicating that the distinction therebetween was clear. It was confirmed that the contrast between the graphene and the nickel was not significantly affected by the wavelength of the laser light with which the surface of the specimen was irradiated, but the contrast was most pronounced at a wavelength of 543 nm.

In addition, referring to FIG. 20, it can be seen that, similarly to the images of Reference Examples 2 to 5, in each of the images of Reference Examples 6 to 9, obtained using the confocal laser scanning microscope in reflection mode, the synthesized graphene appeared dark and the palladium appeared bright, suggesting that the distinction therebetween was clear.

Meanwhile, when compared with the planar image of Example 1, in which the synthesized graphene appeared bright and the copper appeared dark, the graphenes synthesized in Reference Examples 2 to 9 appeared dark and the metals appeared bright. It is determined that this is attributed to the differences in the thicknesses and crystallinities of the multilayer graphenes and the optical characteristics of the metals.

That is, it can be seen that the method for evaluating the quality of graphene according to one embodiment of the present disclosure can evaluate the quality of graphene formed on various types of metal layers.

Simulation

The optical conductivity of graphene was derived from the tight-binding approximation. The carriers in graphene can be expressed by the relativistic massless Dirac equation in (2+1) dimensions. The Dirac Hamiltonian equation $H = V_F \sigma_a p_a$ gives the energy spectrum of charge carriers in the electron (m=0) and hole (m=1) bands in $E_{\vec{k}m} = (-1)^m V_F \hbar k$. The corresponding wave function is $|\vec{k}m\rangle$. Here the $\sigma_\alpha$ are Pauli matrices with $\alpha=(x, y)$, $p_\alpha$ is the momentum operator, and $\vec{k}=(k_x, k_y)$ and $k=|\vec{k}|$ are the wave vector.

Using the Kubo formula, the effective conductivity of the graphene can be obtained consisting of intraband and interband contributions ($\sigma(\omega)=\sigma_{intraband}(\omega)+\sigma_{interband}(\omega)$). Here, $\sigma_{intraband}(\omega)$ is $$i\frac{e^2 \mu}{\pi \hbar^2 (\omega + i\gamma)},$$

and $\sigma_{interband}(\omega)$ is $$\frac{e^2}{4\hbar}\left\{\theta(\hbar\omega - |2\mu|)\right\} + i\frac{1}{\pi}\log\left|\frac{\hbar\omega + |2\mu|}{\hbar\omega - |2\mu|}\right|.$$

If the graphene lies between medium 1 (air) and medium 2 (copper), the boundary conditions from Maxwell's equations at z=0 are given by:

$$\left[\varepsilon_1\left(\vec{E}_i + \vec{E}_r\right) - \varepsilon_2 \vec{E}_t\right] \cdot \vec{n} = \rho^{graphene}$$

$$\left[\vec{k}_i \times \vec{E}_i + \vec{k}_r \times \vec{E}_r - \vec{k}_t \times \vec{E}_t\right] \cdot \vec{n} = 0$$

$$\left[\vec{E}_i + \vec{E}_r - \vec{E}_t\right] \times \vec{n} = 0$$

$$\frac{1}{\omega}\left[\frac{1}{\mu_1}\left(\vec{k}_i \times \vec{E}_i + \vec{k}_r \times \vec{E}_r\right) - \frac{1}{\mu_2}\left(\vec{k}_t \times \vec{E}_t\right)\right] \times \vec{n} = \vec{j}_x = \sigma(\omega)\vec{E}_x$$

Where $\varepsilon_1$ and $\varepsilon_2$ are the respective permittivities of the two media, and $\mu_1$ and $\mu_2$ are the respective permeabilities of the two media. In addition, $\rho^{graphene}$ is the graphene charge density, and $\vec{E}_i$ is the incident electric field, $\vec{E}_r$ is the reflected electric field, and $\vec{E}_t$ is transmitted electric field.

Furthermore, the following relationship can be derived:

$$(E_i - E_r)\cos\theta_1 - E_t\cos\theta_2 = 0$$

$$\sqrt{\frac{\varepsilon_1}{\mu_1}}(E_i + E_r) - \sqrt{\frac{\varepsilon_1}{\mu_1}}E_t = \sigma(\omega)E_t\cos\theta_2$$

The magnetic fields are perpendicular to the plane of incidence, and when the continuity equation in momentum space is applied, the following relationship can be derived:

$$\rho^{graphene} = \frac{k_x}{\omega}j_x(\omega) = \frac{k_x}{\omega}\sigma(\omega)E_x = \frac{k_x}{\omega}\sigma(\omega)E_t\cos\theta_2$$

Since the magnetic permeabilities are zero, the transmission coefficient ($t_p$) and the reflection coefficient ($r_p$) can be obtained as follows:

$$t_p \equiv \frac{E_t}{E_i} = \frac{2n_1\cos\theta_1}{n_1\cos\theta_2 + n_2\cos\theta_1 + \frac{\sigma(\omega)\cos\theta_1\cos\theta_2}{c\varepsilon_0}}$$

$$r_p \equiv \frac{E_r}{E_i} = \frac{-n_1\cos\theta_2 + n_2\cos\theta_1 + \frac{\sigma(\omega)\cos\theta_1\cos\theta_2}{c\varepsilon_0}}{n_1\cos\theta_2 + n_2\cos\theta_1 + \frac{\sigma(\omega)\cos\theta_1\cos\theta_2}{c\varepsilon_0}}$$

If graphene is absent, the above coefficients lead to the ordinary results. Finally, the reflectance ($R_p$) and transmittance ($T_p$) as a function of wavelength and chemical potential can be obtained as follows:

$$R_p = |r_p|^2$$

$$T_p = \frac{n_2\cos\theta_2}{n_1\cos\theta_1}|t_p|^2$$

As described above, the method for evaluating the quality of graphene according to one embodiment of the present disclosure may evaluate in real time the quality of graphene being continuously formed.

In addition, the method for evaluating the quality of graphene according to one embodiment of the present disclosure may quickly evaluate the quality of graphene being formed in a large area.

Effects of the present disclosure are not limited to the above-described effects, and effects not mentioned herein will be clearly understood by those skilled in the art from the present specification and the accompanying drawings.

We claim:

1. A method of evaluating quality of graphene using a confocal laser scanning microscope, the method comprising steps of:
    irradiating with laser light a graphene layer formed on a catalyst layer;
    detecting a signal of light reflected from the graphene layer;
    forming a planar image of the graphene layer using the detected optical signal; and analyzing a contrast between graphene and the catalyst layer in the planar image, wherein the graphene layer is continuously formed on the catalyst layer by a roll-to-roll process.

2. The method of claim 1, wherein the graphene layer is formed on the catalyst layer by chemical vapor deposition.

3. The method of claim 1, wherein the catalyst layer comprises at least one of Cu, Ni, Co, Fe, Pt, Au, Al, Cr, Mg, Mn, Rh, Si, Ta, Ti, W, U, V, Zr, Fe, brass, bronze, cupronickel, stainless steel, and Ge.

4. The method of claim 1, which is performed in real time during continuous formation of the graphene layer.

5. The method of claim 1, wherein the laser light with which the graphene layer is irradiated has a wavelength of 400 nm to 550 nm.

6. The method of claim 1, wherein the step of analyzing the contrast comprises analyzing a gray scale of a predetermined area of the planar image and calculating the contrast between the graphene and the catalyst layer in the area.

7. The method of claim 6, wherein the analyzing of the gray scale comprises obtaining and analyzing a grayscale histogram or a grayscale profile in the area.

8. The method of claim 1, wherein the confocal laser scanning microscope operates without a pinhole.

9. The method of claim 1, further comprising a step of determining that the graphene layer has been formed on the catalyst layer, when the contrast between the graphene and the catalyst layer is 1.05 or higher.

10. The method of claim 2, wherein the chemical vapor deposition is performed at a temperature of 700° C. or higher.

* * * * *